United States Patent
Nakazawa et al.

(10) Patent No.: US 11,312,818 B2
(45) Date of Patent: Apr. 26, 2022

(54) POLYPHENYLENE COMPOUND

(71) Applicant: NISSAN CHEMICAL CORPORATION, Tokyo (JP)

(72) Inventors: Taichi Nakazawa, Funabashi (JP); Shoichi Kondo, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 190 days.

(21) Appl. No.: 16/958,509

(22) PCT Filed: Dec. 27, 2018

(86) PCT No.: PCT/JP2018/048300
§ 371 (c)(1),
(2) Date: Jun. 26, 2020

(87) PCT Pub. No.: WO2019/131932
PCT Pub. Date: Jul. 4, 2019

(65) Prior Publication Data
US 2021/0054138 A1  Feb. 25, 2021

(30) Foreign Application Priority Data

Dec. 28, 2017  (JP) .............................. JP2017-253670

(51) Int. Cl.
  *C08G 61/10*      (2006.01)
  *H01M 8/10*       (2016.01)
  (Continued)

(52) U.S. Cl.
  CPC .......... *C08G 61/10* (2013.01); *H01M 8/1023* (2013.01); *H01M 8/1072* (2013.01); *H01M 2008/1095* (2013.01); *H01M 2300/0082* (2013.01)

(58) Field of Classification Search
  CPC .. C08G 61/10; H01M 8/1023; H01M 8/1072; H01M 2008/1096; H01M 2300/0082
  (Continued)

(56) References Cited

U.S. PATENT DOCUMENTS 7,301,002 B1 * 11/2007 Cornelius ............... C08G 61/10
                                                    429/188
7,816,482 B1 * 10/2010 Hibbs ..................... H01M 4/621
                                                    528/86
(Continued)

FOREIGN PATENT DOCUMENTS

JP        2015-95424 A     5/2015
WO   WO 2009/134227 A    11/2009
WO   WO 2018/187864 A    10/2018

OTHER PUBLICATIONS

Skalski et al., "Structurally-Defined, Sulfo-Phenylated, Oligophenylenes and Polyphenylenes", Journal of the American Chemical Society, 2015, vol. 137, No. 38, pp. 12223-12226. (Year: 2015).*

(Continued)

*Primary Examiner* — Michael M. Bernshteyn
(74) *Attorney, Agent, or Firm* — Birch, Stewart, Kolasch & Birch, LLP

(57) ABSTRACT

This is to provide a non-halogen containing compound excellent in proton conductivity and capable of suitably being used for a polymer electrolytic fuel cell
The compound of the present invention has a structure represented by the following general formula (I).

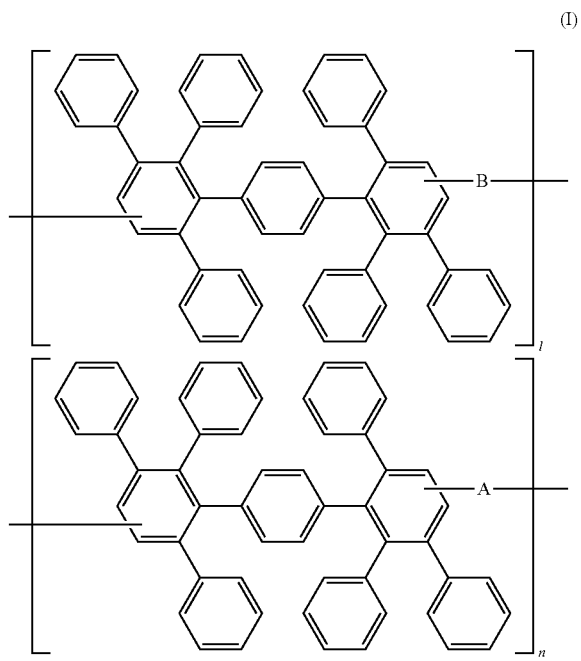

(In the above-mentioned general formula (I), "l" and "n" are molar fractions when l+n=1.0, and 0≤l<1.0 and 0<n≤1.0, A represents a structure represented by the following general formula (II) or (III), B represents a structure represented by the following general formula (VII), the respective structural units are random copolymerized, and at least one benzene ring in the formula (I) has at least one sulfo group.)

(Continued)

(In the above-mentioned general formula (II) or (III), $R^1$ to $R^4$ are each independently selected from hydrogen and an alkyl group having 1 to 3 carbon atoms, le and $R^2$ form together with the carbon atom, they are attached to, an aromatic ring or a fused aromatic ring and $R^3$ and $R^4$ form together with the carbon atom, they are attached to, an aromatic ring or a fused aromatic ring, or $R^1$, $R^3$ and $R^4$ are hydrogens and $R^2$ is a single bond and bonded to the carbon of "c",

- X is a single bond, or a structure represented by the following formula (IV), the following formula (V) or the following formula (VI),
- when X is a single bond, bonds "a"s are both bonded at ortho positions or both bonded at meta positions relative to the carbons bonded to X, when X is a structure represented by the following formula (IV), bonds "a"s are both bonded at para positions relative to the carbons bonded to X, and when it is a structure represented by the following formula (V), bonds "a"s are both bonded at para positions or both bonded at meta positions relative to the carbons bonded to x,
- when X is a structure represented by the following formula (VI), the bonds "a"s in the above-mentioned general formula (II) or (III) exist only one of these, and A binds to other structure or a structural unit by one of the bonds "a"s and the bond "b".)

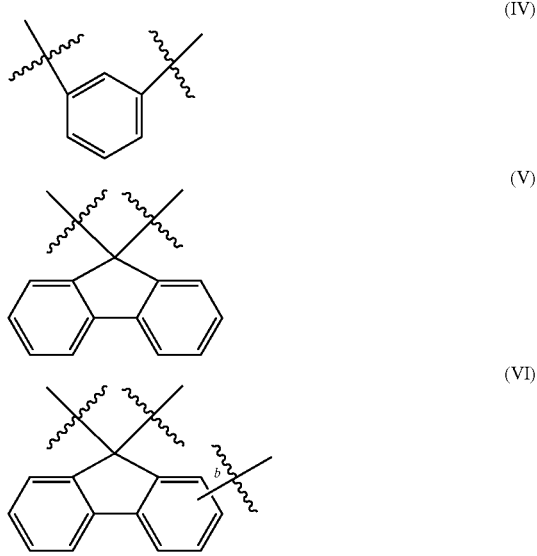

(IV)

(V)

(VI)

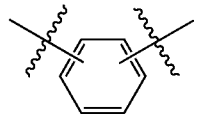

(VII)

7 Claims, 1 Drawing Sheet

(51) Int. Cl.
*H01M 8/1023* (2016.01)
*H01M 8/1072* (2016.01)
(58) Field of Classification Search
USPC .......................................................... 526/75
See application file for complete search history.

(56) References Cited

U.S. PATENT DOCUMENTS

| 8,110,636 | B1* | 2/2012 | Fujimoto | C08F 8/36 |
| | | | | 528/487 |
| 2013/0108944 | A1* | 5/2013 | Yang | C08J 5/2256 |
| | | | | 429/493 |

OTHER PUBLICATIONS

Adamski et al., "Highly Stable, Low Gas Crossover, Proton-Conducting Phenylated Polyphenylenes", Angewandte Chemie, International Edition, 2017, vol. 56, No. 31, pp. 9 058-9061. (Year: 2017).*
Peressin et al., "Effect of steric constraints on the physico-electrochemical properties of sulfonated polyaromatic copolymers," Polymer International, vol. 70, No. 1, Aug. 7, 2020, pp. 96-106, XP055764713.
Peressin et al., "Structure-Property Relationships in Sterically Congested Proton-Conducting Poly(phenylene)s: the Impact of Biphenyl Linearity," Macromolecules, vol. 53, No. 8, Apr. 14, 2020, pp. 3119-3138, XP055764702.
Supplementary European Search Report for European Application No. 18895067.9, dated Jan. 25, 2021.
Adamski et al., "Highly Stable, Low Gas Crossover, Proton-Conducting Phenylated Polyphenylenes", Angewandte Chemie International Edition, 2017, vol. 56, No. 31, p. 9058-9061.
International Search Report, issued in PCT/JP2018/048300, PCT/ISA/210, dated Mar. 12, 2019.
Skalski et al., "Structurally-Defined, Sulfo-Phenylated, Oligophenylenes and Polyphenylenes", Journal of the American Chemical Society, 2015, vol. 137, No. 38, p. 12223-12226.
Written Opinion of the International Searching Authority, issued in PCT/JP2018/048300, PCT/ISA/237, dated Mar. 12, 2019.

* cited by examiner

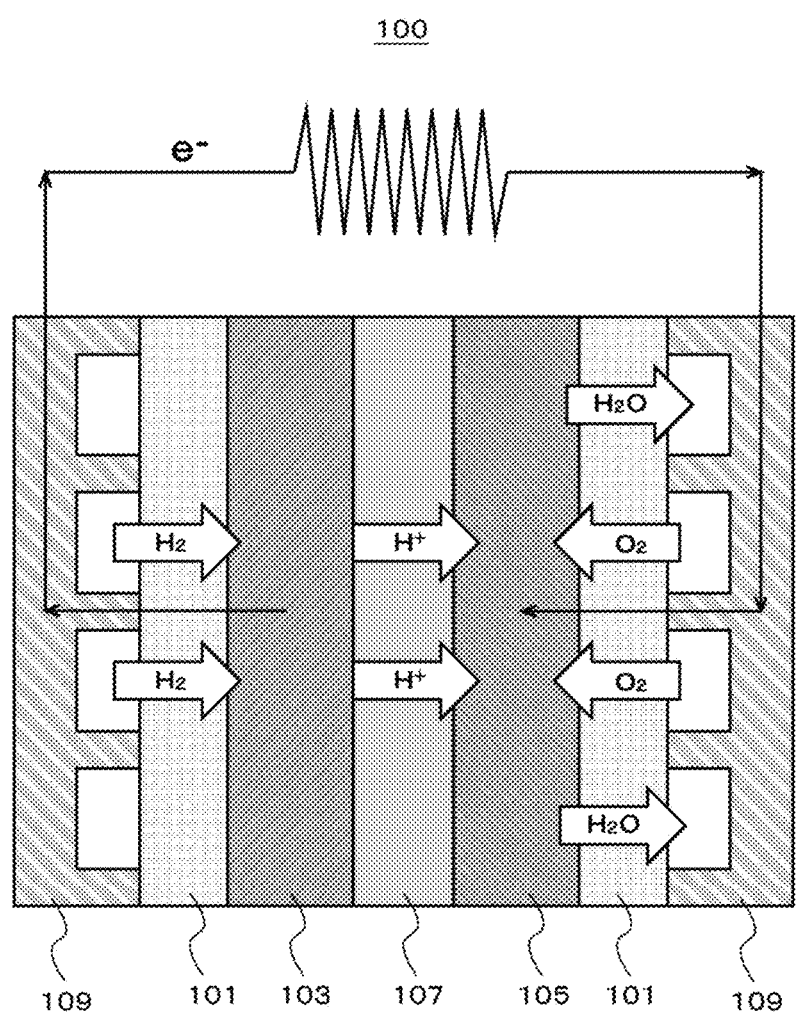

POLYPHENYLENE COMPOUND

TECHNICAL FIELD

The present invention relates to a polyphenylene compound and a fuel cell using the same.

BACKGROUND ART

A polymer electrolytic fuel cell (PEFC) has an anode catalyst layer, a cathode catalyst layer and a solid electrolyte membrane sandwiched by the both catalyst layers.

The electrolyte used for the solid electrolyte membrane is required to have proton conductivity, gas barrier property, electron insulating property and durability. As the electrolyte satisfying such characteristics, a fluorine-based ionomer has been used. However, the fluorine-based ionomer is high cost and has environmental load so that alternative materials have been studied.

On the other hand, an electrolyte is also contained in an anode catalyst layer and a cathode catalyst layer. As the electrolyte, the same material as the solid electrolyte membrane is used in some cases, but the electrolyte of the catalyst layer is required to have gas permeability and also electron conductivity in addition to proton conductivity.

Patent Document 1 and Patent Document 2 disclose, as an alternative material to the fluorine-based ionomer, that a hydrocarbon-based ionomer having an aromatic structure as a skeleton and a sulfone group is introduced to the skeleton is used for a solid electrolyte membrane and an electrolyte of a catalyst layer.

PRIOR ART DOCUMENTS

Patent Documents

Patent Document 1: U.S. Pat. No. 7,301,002
Patent Document 2: JP 2015-95424A

SUMMARY OF THE INVENTION

Problems to be Solved by the Invention

As mentioned above, the electrolyte of the catalyst layer is required to have proton conductivity, gas permeability, durability and electron conductivity, but the materials disclosed in Patent Document 1 and 2 are required to be further improved from these viewpoints.

An object of the invention of the present application is to provide a halogen free compound excellent in proton conductivity, and suitably used for a polymer electrolytic fuel cell.

Means to Solve the Problems

The present invention has, for example, the following constitution.

[1] A compound having the structure represented by the following general formula (I).

[Formula 1]

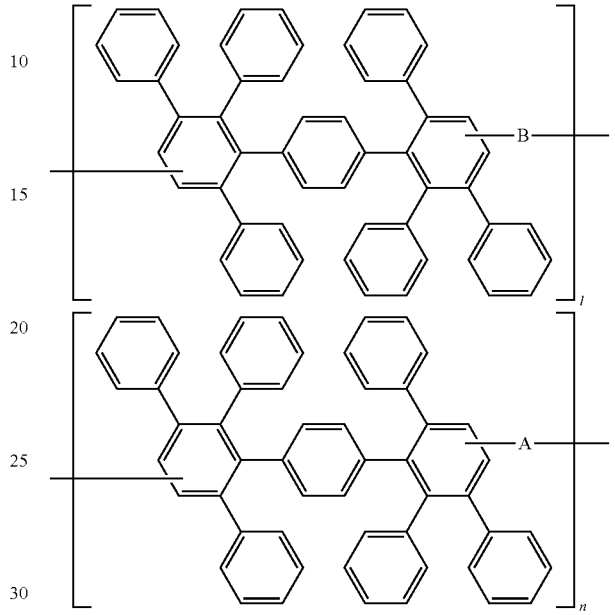

(In the above-mentioned general formula (I), "l" and "n" are molar fractions when l+n=1.0, and 0≤l<1.0 and 0<n≤1.0,
A represents a structure represented by the following general formula (II) or (III),
B represents a structure represented by the following general formula (VII),
the respective structural units are random copolymerized, and
at least one benzene ring in the formula (I) has at least one sulfo group.)

[Formula 2]

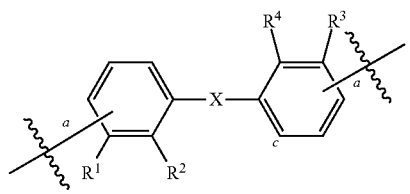

[Formula 3]

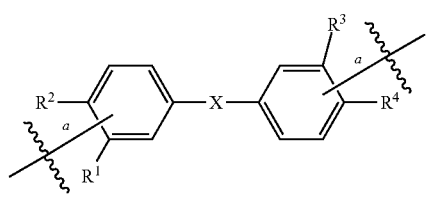

(In the above-mentioned general formula (II) or (III), le to $R^4$ are each independently selected from hydrogen and an alkyl group having 1 to 3 carbon atoms, $R^1$ and $R^2$ form together with the carbon atom, they are attached to, an aromatic ring or a fused aromatic ring and R³ and R⁴ form together with the carbon atom, they are attached to, an aromatic ring or a fused aromatic ring, or R', R³ and R⁴ are hydrogens and R² is a single bond and bonded to the carbon of "c", X is a single bond, or a structure represented by the following formula (IV), the following formula (V) or the following formula (VI), when X is a single bond, bonds "a"s are both bonded at ortho positions or both bonded at meta positions relative to the carbons bonded to X, when X is a structure represented by the following formula (IV), the bonds "a"s are both bonded at para positions relative to the carbons bonded to X, and when it is a structure represented by the following formula (V), the bonds "a"s are both bonded at para positions or both bonded at meta positions relative to the carbons bonded to X, when X is a structure represented by the following formula (VI), the bonds "a"s in the above-mentioned general formula (II) or (III) exist only one of these, and A binds to other structure or a structural unit by one of the bonds "a"s and the bond "b".)

[Formula 4]

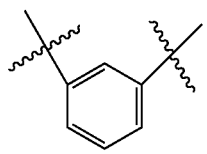
(IV)

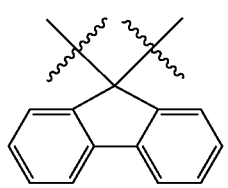
(V)

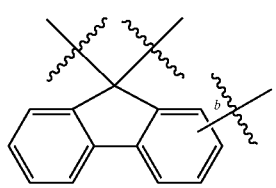
(VI)

[Formula 5]

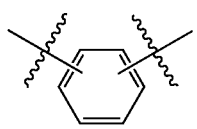
(VII)

[2] The compound of [1], wherein, in the above-mentioned general formula (I), the structure represented by A is at least one kind selected from the group consisting of

[Formula 6]

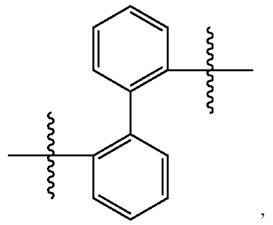
,

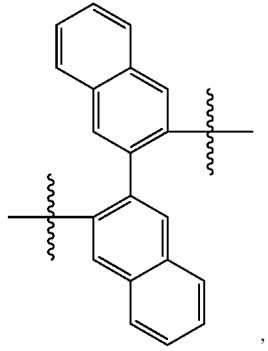
,

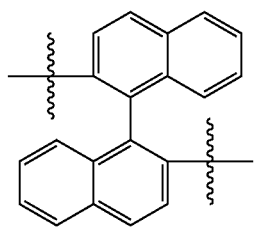
,

,

,

,

-continued

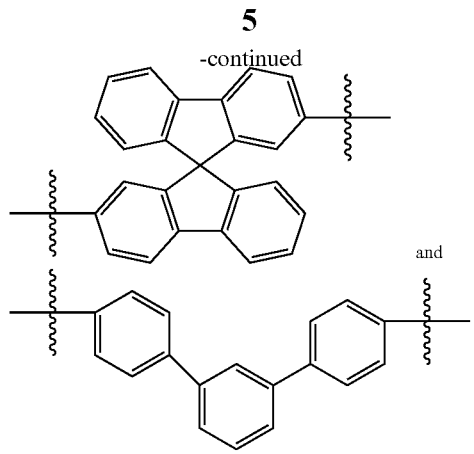

and

[3] The compound of [1] or [2] for a fuel cell.
[4] The compound of [3] used for an electrolyte of an anode catalyst layer and/or a cathode catalyst layer of a fuel cell.
[5] A catalyst layer of a fuel cell containing the compound of any of [1] to [4].
[6] A method for producing the compound of [1], which comprises Step 1 of reacting a compound represented by the following formula (VIII), a compound represented by the following formula (IX) and optionally a compound represented by the following formula (X) to obtain a compound represented by the following formula (XI),

[Formula 7]

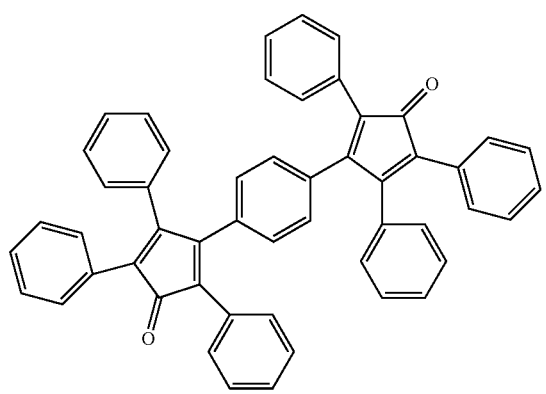

(VIII)

(IX)

(X)

(XI)

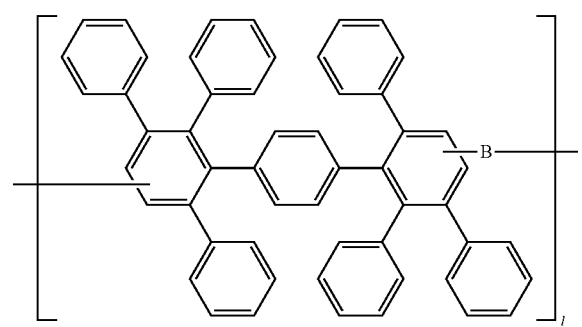

-continued

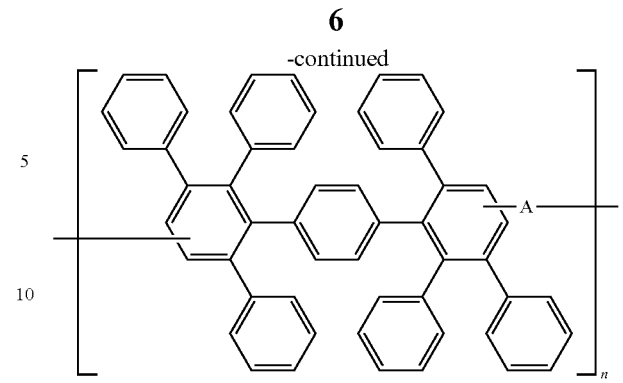

(In the above-mentioned general formulae (IX) and (XI), "1", "n", A and B have the same meanings as defined in the formula (I). Provided that each benzene ring does not have a sulfo group.) and
Step 2 of sulfonating the compound represented by the above-mentioned formula (XI) to obtain the compound represented by the above-mentioned formula (I).
[7] A method for producing the compound of [I], which comprises the step of reacting a compound having at least one sulfo group which became an amine salt in a compound of the following formula (VIII), a compound represented by the following formula (IX) and optionally a compound represented by the following formula (X) to obtain the compound represented by the above-mentioned formula (I):

[Formula 8]

(VIII)

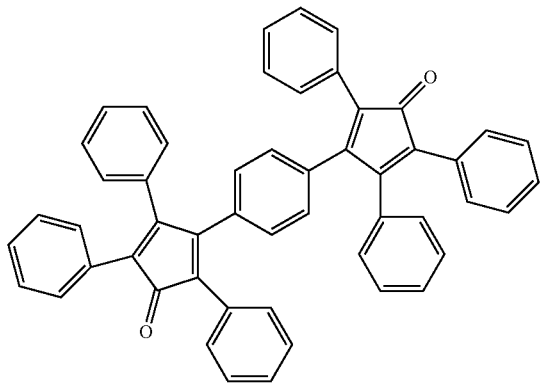

(IX)

(X)

(In the above-mentioned general formula (IX), A has the same meaning as defined in the formula (I).).

Effects of the Invention

The compound of the invention of the present application exhibits excellent proton conductivity when it is used in a catalyst layer of a polymer electrolytic fuel cell.

BRIEF DESCRIPTION OF THE DRAWING

FIG. 1 is a schematic drawing showing a constitution of the fuel battery in the embodiment.

EMBODIMENT TO CARRY OUT THE INVENTION

The present invention relates to a compound having the structure represented by the following general formula (I).

[Formula 9]

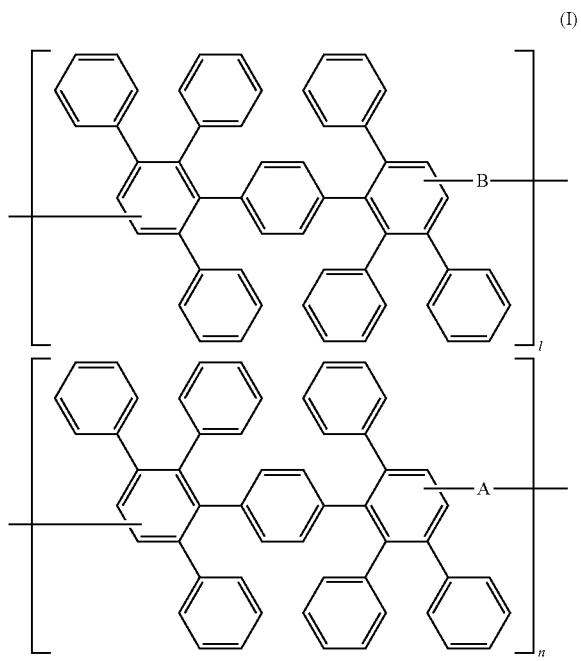

(I)

(In the above-mentioned general formula (I), "l" and "n" are molar fractions when l+n=1.0, and 0≤l<1.0 and 0<n≤1.0,
A represents a structure represented by the following general formula (II) or (III),
B represents a structure represented by the following general formula (VII),
the respective structural units are random copolymerized, and
at least one benzene ring in the formula (I) has at least one sulfo group.)

[Formula 10]

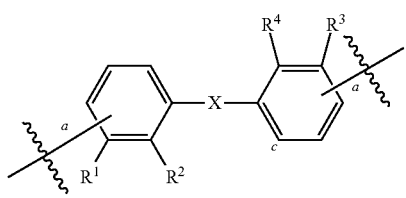

(II)

[Formula 11]

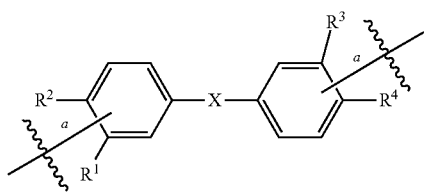

(III)

(In the above-mentioned general formula (II) or (III), le to $R^4$ are each independently selected from hydrogen and an alkyl group having 1 to 3 carbon atoms, $R^1$ and $R^2$ form together with the carbon atom, they are attached to, an aromatic ring or a fused aromatic ring and $R^3$ and $R^4$ form together with the carbon atom, they are attached to, an aromatic ring or a fused aromatic ring, or R', $R^3$ and $R^4$ are hydrogens and $R^2$ is a single bond and bonded to the carbon of "c",
X is a single bond, or a structure represented by the following formula (IV), the following formula (V) or the following formula (VI),
when X is a single bond, bonds "a"s are both bonded at ortho positions or both bonded at meta positions relative to the carbons bonded to X, when X is a structure represented by the following formula (IV), bonds "a"s are both bonded at para positions relative to the carbons bonded to X, and when it is a structure represented by the following formula (V), bonds "a"s are both bonded at para positions or both bonded at meta positions relative to the carbons bonded to X,
when X is a structure represented by the following formula (VI), the bonds "a"s in the above-mentioned general formula (II) or (III) exist only one of these, and A binds to other structure or a structural unit by one of the bonds "a"s and the bond "b".)

[Formula 12]

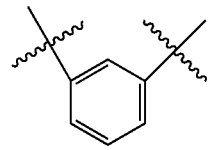

(IV)

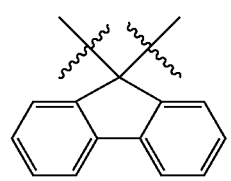

(V)

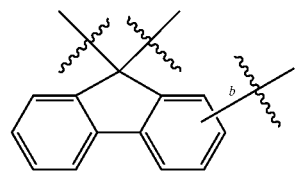

(VI)

[Formula 13]

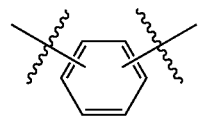

(VII)

As the alkyl group having 1 to 3 carbon atoms which is options of $R^1$ to $R^4$, there may be mentioned a methyl group, an ethyl group, an n-propyl group and an i-propyl group. Among these, a methyl group is preferable.

The reason why such a structure is employed is that it can be considered that it is bulky due to the polyphenylene structure and A is preferably bonded to the main chain by twisting so that gas permeability is excellent, it has a sulfo group so that proton conductivity is excellent, and further, it has an arbitrary phenylene structure so that it can exhibit flexibility.

A may be exemplified by the following structure.

In the general formula (II) or (III), as examples in which $R^1$ to $R^4$ are each independently hydrogen or an alkyl group having 1 to 3 carbon atoms, X is a single bond, and the bonds "a"s are both bonded at ortho positions or both bonded at meta positions relative to the carbon atoms bonded to X, there may be mentioned

[Formula 14]

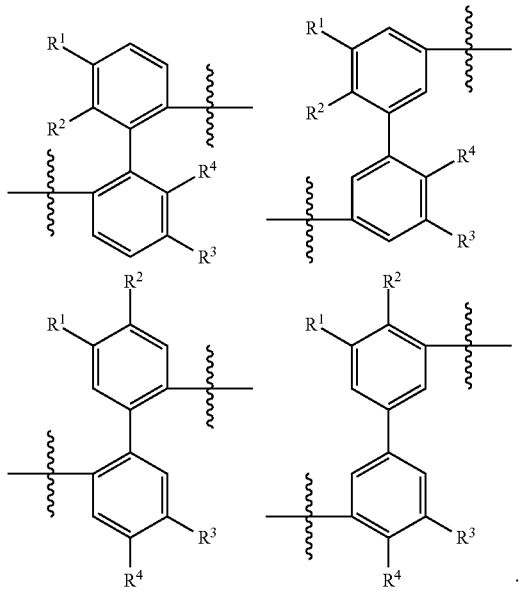

In the above-mentioned general formula (II) or (III), as examples in which $R^1$ to $R^4$ are each independently hydrogen or an alkyl group having 1 to 3 carbon atoms, X is represented by the formula (IV), and the bonds "a"s are both bonded at para positions relative to the carbon bonded to X, there may be mentioned

[Fromula 15]

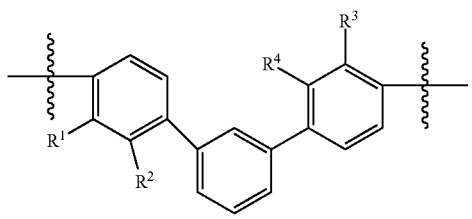

In the above-mentioned general formula (II), as examples in which $R^1$ and $R^2$ form together with the carbon atom, they are attached to, an aromatic ring or a fused aromatic ring and $R^3$ and $R^4$ form together with the carbon atom, they are attached to, an aromatic ring or a fused aromatic ring, X is a single bond, and the bonds "a"s are both bonded at ortho positions or both bonded at meta positions relative to the carbon atoms bonded to X, there may be mentioned

[Formula 16]

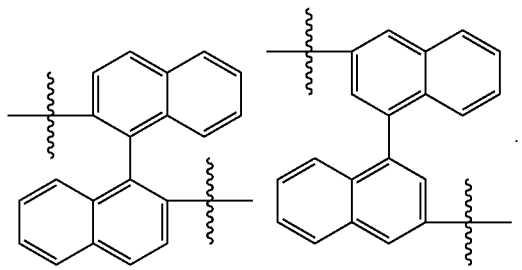

In the above-mentioned general formula (III), examples in which $R^1$ and $R^2$ form together with the carbon atom, they are attached to, an aromatic ring or a fused aromatic ring and $R^3$ and $R^4$ form together with the carbon atom, they are attached to, an aromatic ring or a fused aromatic ring, X is a single bond, and the bonds "a"s are both bonded at ortho positions relative to the carbon atoms bonded to X, there may be mentioned

[Formula 17]

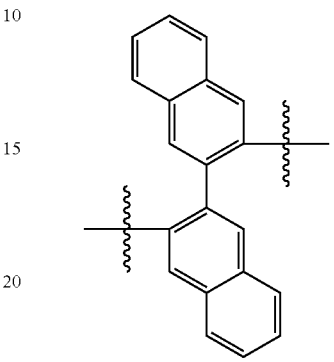

In the above-mentioned general formula (II) or (III), examples in which $R^1$ to $R^4$ are each independently hydrogen or an alkyl group having 1 to 3 carbon atoms, X is represented by the formula (V), and the bonds "a"s are both bonded at para positions relative to the carbon atoms bonded to X, there may be mentioned

[Formula 18]

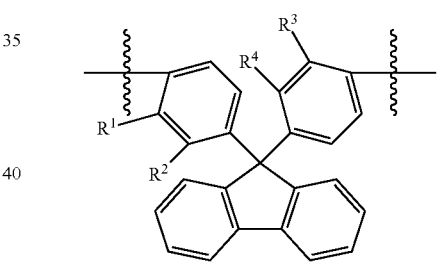

In the above-mentioned general formula (II), examples in which $R^1$, $R^3$ and $R^4$ are hydrogens, and $R^2$ is a single bond and bonded to the carbon of "c", X is represented by the formula (V), and the bonds "a"s are both bonded at meta positions relative to the carbon atoms bonded to X, there may be mentioned

[Formula 19]

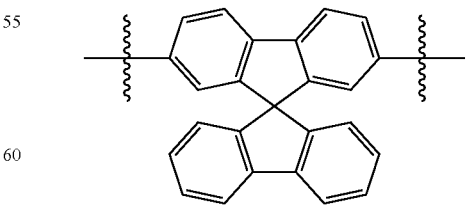

In the above-mentioned general formula (II), examples in which $R^1$, $R^3$ and $R^4$ are hydrogens, and $R^2$ is a single bond and bonded to the carbon of "c", X is represented by the formula (VI), the bonds "a"s in the formula (II) exist only one of these, and A binds to other structure or a structural unit by one of the bonds "a"s and the bond "b", there may be mentioned

[Formula 20]

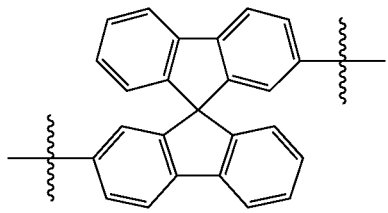

Among these, from the viewpoints of proton conductivity and gas permeability, A in the formula (I) is preferably at least one kind selected from the group consisting of

[Formula 21]

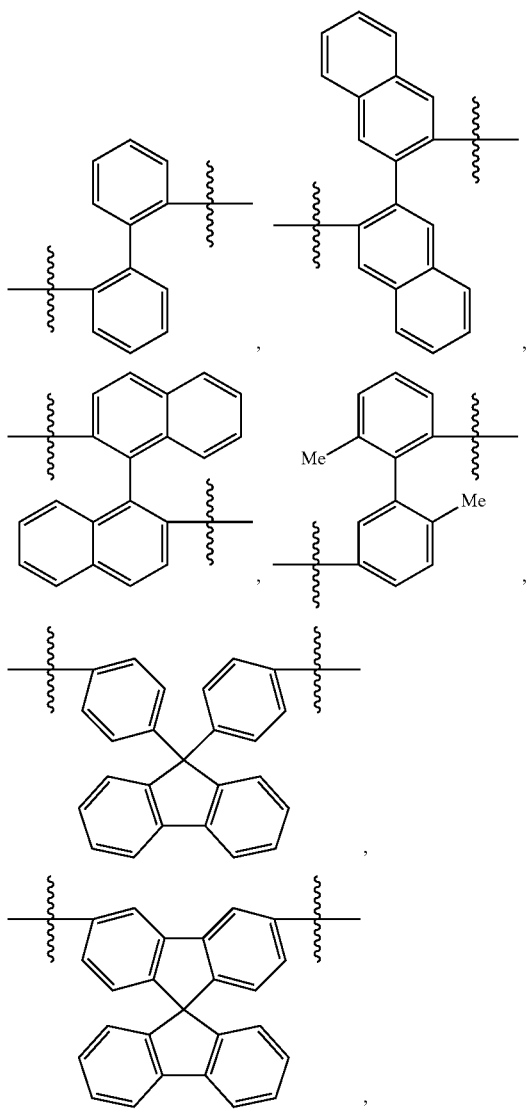

-continued

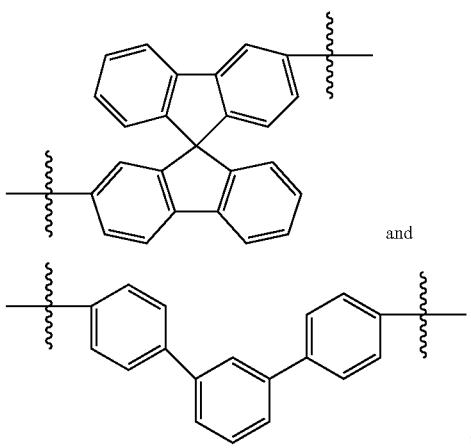

among these, it is more preferably at least one kind of the structure selected from the following group,

[Formula 22]

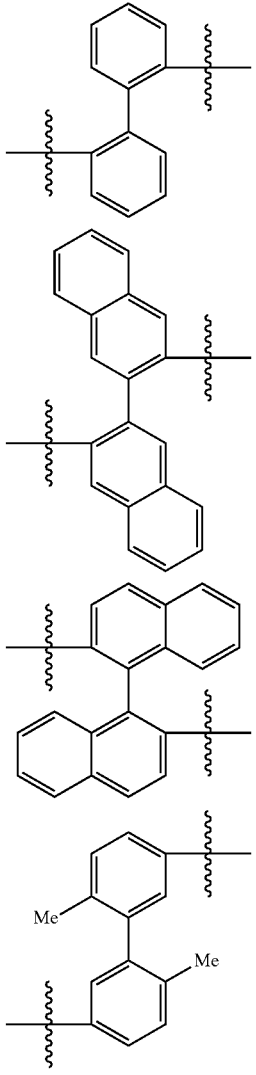

-continued

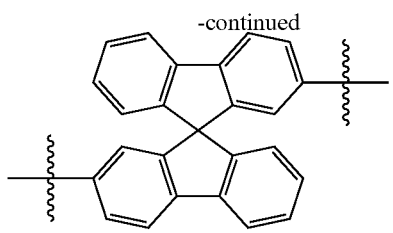

and the following structure is further preferred.

[Formula 23]

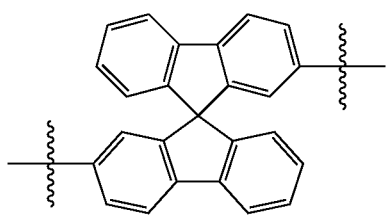

As the B, the following structures can be exemplified.

[Formula 24]

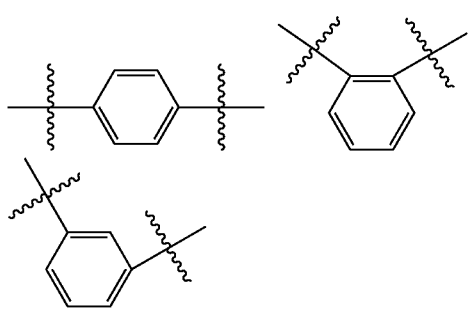

In the compound represented by the formula (I), from the viewpoints of gas permeability and flexibility, contained ratios of the respective constitutional units are such that the molar fractions are $0 \leq l < 1.0$ and $0 < n \leq 1.0$ when $l+n=1.0$.

The respective constitutional units where the molar fractions are "l" and "n" are randomly copolymerized.

Specifically, as clearly seen from the producing method mentioned later, A and B are never adjacent to each other.

At least one of the benzene rings in the compound represented by the formula (I) has at least one sulfo group. In the benzene rings, the benzene rings contained in A and B are also contained. From the viewpoints of proton conductivity, the sulfo group is preferably present at least in the benzene ring at the side chain in the compound represented by the formula (I). From the viewpoints of proton conductivity, the number of the sulfo group(s) per total benzene rings forming the side chain and the main chain is preferably 1 to 11, more preferably 2 to 6, and further preferably 4.

A weight average molecular weight (Mw) of the compound represented by the formula (I) measured by the method described in Examples is preferably $1 \times 10^3$ to $1 \times 10^6$, more preferably $5 \times 10^3$ to $5 \times 10^5$, and further preferably $1 \times 10^4$ to $2 \times 10^5$.

A proton exchange capacity (IEC) of the compound represented by the formula (I) is preferably 0.5 to 5.0 meq/g, more preferably 0.8 to 3.0 meq/g, and further preferably 0.9 to 2.0 meq/g. Incidentally, this value is a value measured by the method described in Examples.

[Production Method of Compound]

(A) Production Method by Subjecting to Sulfonation after Diels-Alder Reaction

The compound represented by the formula (I) can be produced by a method which comprises Step 1 of reacting a compound represented by the following formula (VIII), a compound represented by the following formula (IX) and optionally a compound represented by the following formula (X) to obtain a compound represented by the following formula (XI),

[Formula 25]

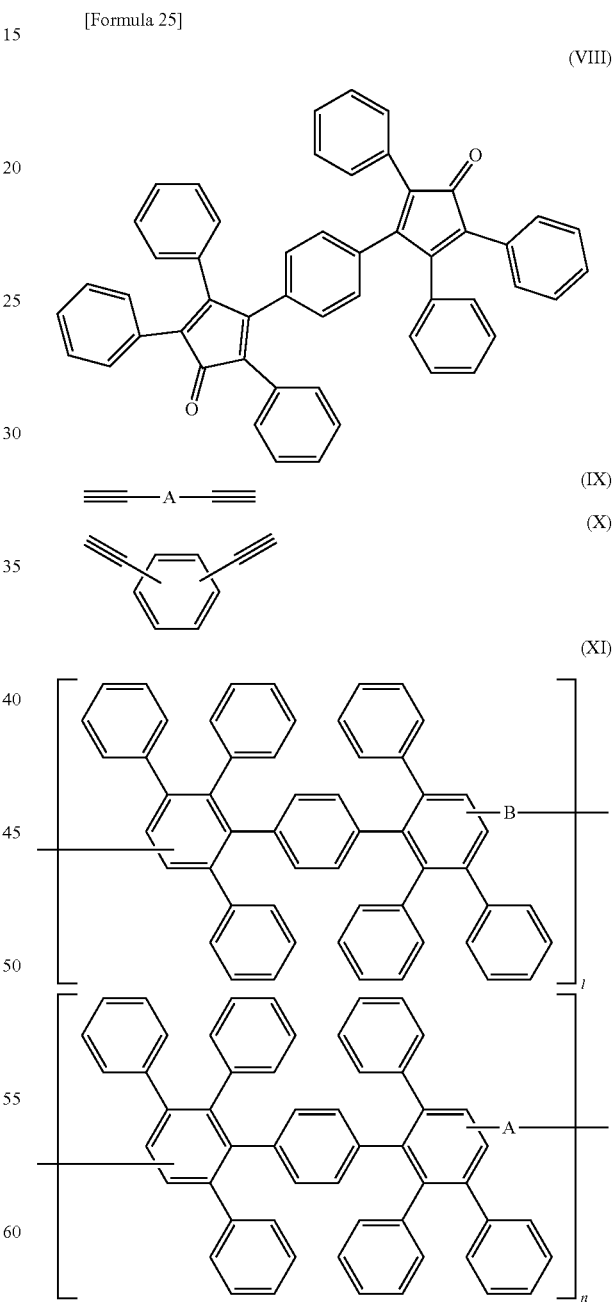

(In the above-mentioned general formula (IX) and (XI), "l", "n", A and B have the same meanings as defined in the formula (I). Provided that each benzene ring does not have a sulfo group.) and Step 2 of sulfonating the compound represented by the above-mentioned formula (XI) to obtain the compound represented by the above-mentioned formula (I).

(1) Step 1

In Step 1, the compound represented by the above-mentioned formula (VIII), and the compound represented by the above-mentioned formula (IX) and optionally the compound represented by the above-mentioned formula (X) are subjected to Diels-Alder reaction whereby the five-membered ring of the compound represented by the above-mentioned formula (VIII) and the triple bond(s) of the compound represented by the above-mentioned formula (IX) and optionally the compound represented by the above-mentioned formula (X) are reacted to form a six-membered ring, and also the carbonyl group of the compound represented by the above-mentioned formula (VIII) is eliminated and an irreversible reaction proceeds whereby the compound represented by the formula (XI) can be obtained.

A reaction temperature is usually 100 to 300° C. Incidentally, the compound represented by the above-mentioned formula (IX) and optionally the compound represented by the above-mentioned formula (X) can be obtained by, for example, reacting a halogenated starting material with ethynyltrimethylsilane, and then, removing a trimethylsilyl group.

(2) Step 2

In Step 2, a sulfo group(s) is/are introduced into one or more benzene rings in the formula (XI).

As a reagent to be reacted with the formula (XI), there may be mentioned trimethylsilyl chlorosulfonate, chlorosulfuric acid, fuming sulfuric acid, sulfuric acid, etc., and these reagents are preferably reacted in an amount of 0.5 to 6-fold in terms of an equivalent ratio based on the molecular weight per a unit structure calculated by using the molar fraction in the formula (XI).

A reaction temperature is usually 0 to 100° C.

The sulfo group can be also introduced into any benzene ring in the formula (XI) including the benzene rings contained in A and B, and for example, the following compounds may be mentioned as the compound of the formula (I).

[Formula 26]

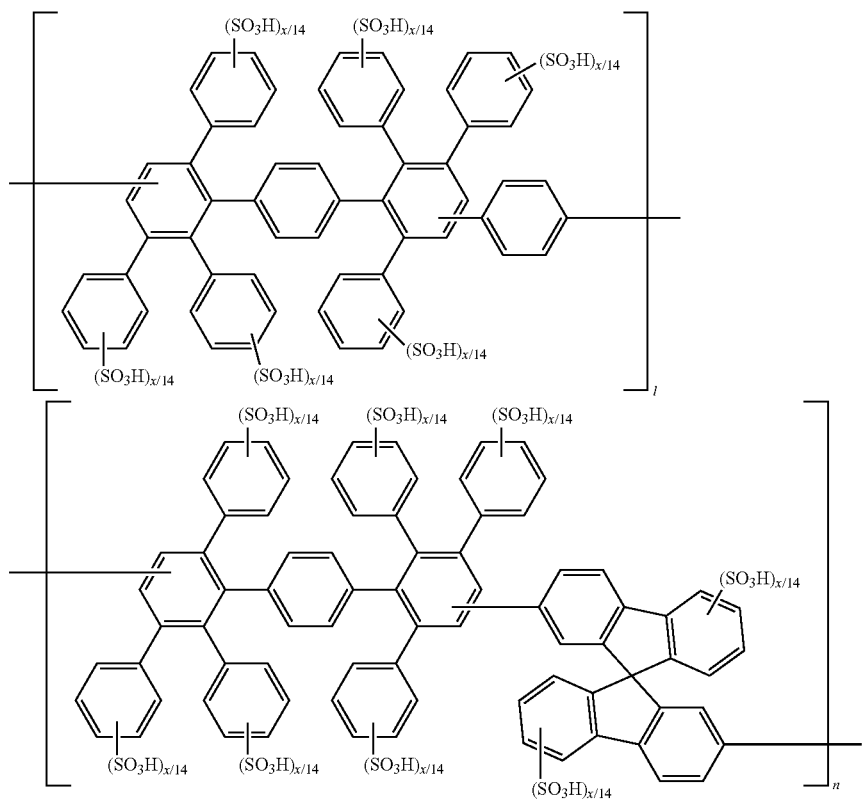

(In the formulae, "l" and "n" have the same meanings as in the formula (I), and $0<x\leq 14$.)

(B) Production Method by Subjecting to Sulfonation Before Diels-Alder Reaction (1) Step 1

In Step 1, a sulfo group(s) is/are introduced into one or more benzene rings in the formula (VIII).

As a reagent to be reacted with the formula (VIII), there may be mentioned trimethylsilyl chlorosulfonate, chlorosulfuric acid, fuming sulfuric acid, sulfuric acid, etc., and these reagents are preferably reacted in an amount of 0.5 to 6-fold in terms of an equivalent ratio based on the molecular weight per a unit structure calculated by using the molar fraction in the formula (XI).

A reaction temperature is usually 0 to 100° C.

The sulfo group can be also introduced into any benzene ring in the formula (VIII) including the benzene rings contained in A and B, and the number of the sulfo group is not particularly limited and for example, the following compound (XII) may be mentioned.

[Formula 27]

[Chemical structure showing a compound with multiple phenyl rings, SO₃H groups, and carbonyl groups]

(2) Step 2

In Step 2, the sulfo group introduced in Step 1 of the compound of the formula (VIII) is made an amine salt.

The reagent to be reacted with the compound of the formula (VIII) into which the sulfo group has been introduced may be mentioned triethylamine.

A reaction temperature is not particularly limited, and the reaction proceeds at room temperature.

(3) Step 3

In Step 3, the compound of the formula (VIII) into which at least one sulfo group which became an amine salt obtained in Step 2 is introduced, the compound represented by the above-mentioned formula (IX) and optionally the compound represented by the above-mentioned formula (X) are subjected to Diels-Alder reaction to obtain a compound represented by the formula (I). The progress of the reaction is the same as mentioned in the producing method of (A).

A reaction temperature is usually 100 to 300° C.

According to the producing method (B), it is possible to control the number of the sulfo groups to be introduced.

[Fuel Cell]

FIG. 1 is a sectional view schematically showing the constitution of a fuel cell. The fuel cell 100 has an anode catalyst layer 103, a cathode catalyst layer 105 and a solid electrolyte membrane sandwiched by the both catalyst layers 107, and each catalyst layer has a gas diffusion layer (Gas Diffusion Layer, hereinafter also referred to as "GDL".) 101 outside thereof. This constitution is called a membrane electrode assembly (Membrane Electrode Assembly, hereinafter also referred to as "MEA"). The fuel cell generally comprises the membrane electrode assembly (MEA) sandwiched by separators 109.

The above-mentioned compound represented by the formula (I) can be used for the anode catalyst layer 103, the cathode catalyst layer 105 and the solid electrolyte membrane 107 of the fuel cell, preferably used for the anode catalyst layer 103 and the cathode catalyst layer 105 of the fuel cell, and more preferably used for at least the cathode catalyst layer 105 from the viewpoints of suppressing increase in overvoltage caused by lowering in oxygen gas diffusibility during high current driving.

The catalyst layers 103 and 105 contain the catalyst components, the catalyst carriers for supporting the catalyst components and the electrolyte, respectively.

As the catalyst components of the anode catalyst layer 103, well known catalysts can be used without any particular limitation, and as the catalyst components of the cathode catalyst layer 105, well known catalysts can be used without any particular limitation. As the catalyst components used for such an anode catalyst layer 103 and cathode catalyst layer 105, there may be mentioned, for example, a metal such as platinum, gold, silver, ruthenium, iridium, rhodium, palladium, osmium, tungsten, lead, iron, chromium, cobalt, nickel, manganese, vanadium, molybdenum, gallium, aluminum, etc., and an alloy of these metals.

As the catalyst carrier, there may be mentioned, for example, carbon particles such as carbon black, activated charcoal, coke, natural graphite, artificial graphite, etc.

As the electrolyte, the above-mentioned compound represented by the formula (I) is used.

The catalyst layers 103 and 105 contain the above-mentioned catalyst component, a catalyst carrier for supporting the catalyst component and an electrolyte, and can be produced by a conventionally known producing method such as a method in which a composition in which these are dispersed in a dispersing medium is coated onto a solid electrolyte membrane or to a gas diffusion layer, a method in which a composition containing he above-mentioned catalyst component, a catalyst carrier for supporting the catalyst component and an electrolyte, and these are dispersed in a dispersing medium is coated onto a substrate and dried to form a catalyst layer, and then, the catalyst layer is transferred to a solid electrolyte, etc.

The above-mentioned compound represented by the formula (I) can coat the catalyst supported on the catalyst carrier with an appropriate thickness, so that gas diffusibility and proton conductivity are good while maintaining the function of the catalyst. An amount of the above-mentioned compound represented by the formula (I) based on that of the catalyst is preferably 0.1 to 10-fold by mass.

As the material of the solid electrolyte membrane 107, there may be mentioned perfluorosulfonic acid polymers such as Nafion (Registered Trademark, available from DuPont de Nemours, Inc.), Aquivion (Registered Trademark, available from Solvay S.A.), FLEMION (Registered Trademark, available from AGC Inc.), Aciplex (Registered Trademark, available from Asahi Kasei Corporation), etc., and from the viewpoints of proton conductivity, there may be mentioned the above-mentioned compound represented by the formula (I).

The gas diffusion layer 101 is not particularly limited and a porous material having conductivity is suitably used, and such a material may be mentioned, for example, carbonaceous paper and nonwoven fabric, felt, nonwoven fabric, etc.

EXAMPLE

[Measurement Method]

(1) Weight Average Molecular Weight and Number Average Molecular Weight

These are the measurement results by gel permeation chromatography (hereinafter abbreviated to as GPC). A GPC apparatus manufactured by TOSOH CORPORATION was used for the measurement, and the measurement conditions, etc., were as follows.

GPC column: TSKgel SuperHZM-N; TSKgel SuperHZ3000; TSKgel SuperHZ2000 (TOSOH CORPORATION)

Column temperature: 40° C.

Solvent: tetrahydrofuran (THF)

Flow amount: 0.6 ml/min

Standard samples: Polystyrene (available from TOSOH CORPORATION)

(2) Proton Exchange Capacity

A membrane obtained by the method mentioned below was immersed in a 2M NaCl aqueous solution at room temperature for 24 hours, and the immersed solution was subjected to neutralization titration with a 0.02M NaOH aqueous solution. The proton exchange capacity was calculated from an amount of the 0.02M NaOH required for neutralization and a weight of the membrane before immersion.

(3) Proton Conductivity

Using a membrane resistance measurement system MTS740 manufactured by Scribner Associates, Inc., the conditions of the temperature and humidification were set to 80° C. and a humidity of 60%, the ionic conductivity in the direction of the membrane thickness was measured and the proton conductivity was calculated therefrom.

(4) Oxygen Permeability

The membrane obtained by the method mentioned below was made 42×42 mm, and using the membrane and GTR-10XF manufactured by GTR TEC Corporation, the temperature was set to 80° C. and the humidity on both surfaces of the membrane was set to 90% RH, and oxygen permeability was measured. The measurement method was carried out in accordance Japanese Industrial Standard JIS K7126-2(GC).

Synthetic Example 1: Synthesis of Compound M-1

[Formula 28]

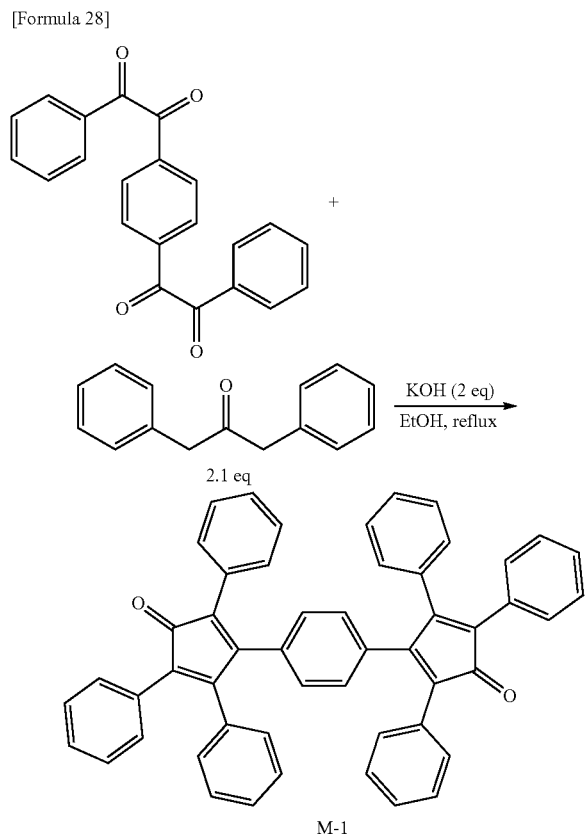

Under nitrogen atmosphere, 5.16 g of 2,2'-(1,4-phenylene)bis(1-phenylene-1,2-dione) and 6.66 g of 1,3-diphenylpropan-2-one were each charged in a reaction apparatus, and 320 ml of ethanol was added thereto. The reaction solution was heated and refluxed, then, a solution prepared by 1.69 g of potassium hydroxide and 8 ml of ethanol was added dropwise to the above solution, and the resulting mixture was stirred under reflux conditions by heating for 30 minutes. After cooling to room temperature by allowing to stand, the mixture was further stirred for 1 hour while cooling with an ice bath and then filtration was carried out. The obtained filtrate was dried to obtain 8.94 g (Yield: 86%) of the objective M-1.

Synthetic Example 2: Synthesis of Compound M-2

[Formula 29]

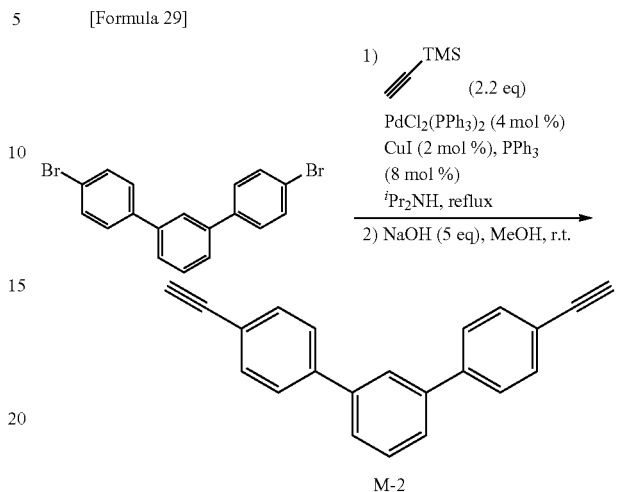

Under nitrogen atmosphere, 3.00 g of 4,4''-dibromo-1,1': 3',1''-terphenyl, 0.22 g of $PdCl_2(PPh_3)_2$, 0.030 g of copper iodide, 0.17 g of triphenyl phosphine, 30 ml of diisopropylamine and 1.64 g of ethynyltrimethylsilane were charged in a reaction apparatus, and the mixture was stirred under reflux conditions by heating for 3 hours. After cooling the reaction mixture to room temperature, methanol was added thereto and filtration was carried out. The filtrate was collected, 65 ml of methylene chloride was added thereto to dissolve the filtrate, then, a solution prepared by dissolving 1.53 g of sodium hydroxide in 30 ml of methanol was added to the solution and the resulting mixture was stirred at room temperature. After 15 minutes, deionized water was added to the reaction mixture and the liquids were separated, the organic phase was washed with saturated saline and filtration by silica gel was carried out. The solvent of the filtrate was removed by distillation under reduced pressure, and the residue was dried to obtain 1.61 g (Yield: 75%) of the objective M-2.

Synthetic Example 3: Synthesis of Compound M-3

[Formula 30]

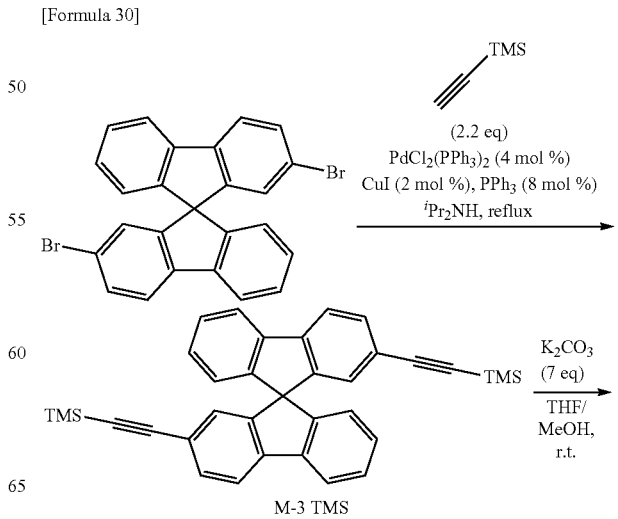

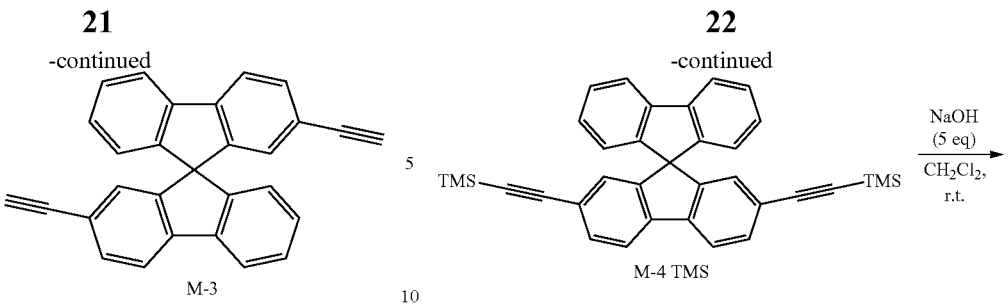

(1) Synthesis of M-3 TMS

Under nitrogen atmosphere, 2.00 g of 2,2'-dibromo-9,9'-spirobi[fluorene], 0.12 g of PdCl$_2$(PPh$_3$)$_2$, 0.016 g of copper iodide, 0.089 g of triphenyl phosphine, 20 ml of diisopropylamine and 0.90 g of ethynyltrimethylsilane were charged in a reaction apparatus, and the mixture was stirred under reflux conditions by heating for 3 hours. The filtrate obtained by filtering the reaction mixture was concentrated and dried. Chloroform was added to the concentrated residue to dissolve the same, and the product was separated and purified by column chromatography to obtain 1.10 g (Yield: 51%) of the objective M-3 TMS.

(2) Synthesis of M-3

Under nitrogen atmosphere, 1.10 g of M-3 TMS, 2.11 g of potassium carbonate and 200 ml of a mixed solvent of THF/MeOH (1:1=v/v) were charged in a reaction apparatus, and the mixture was stirred at room temperature for 2 hours. To the reaction mixture were added methylene chloride and deionized water, and the liquids were separated. The obtained organic phase was concentrated, dried, and subjecting to separation and purification by column chromatography to obtain 0.56 g (Yield: 70%) of the objective M-3.

Synthetic Example 4: Synthesis of Compound M-4

[Formula 31]

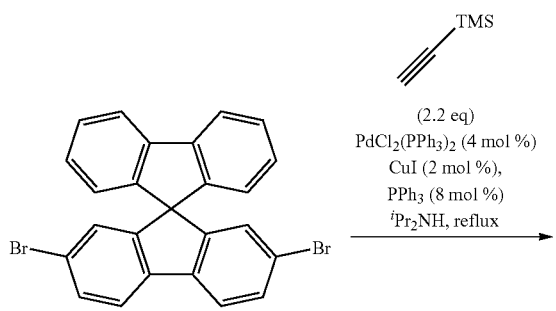

(1) Synthesis of M-4 TMS

Under nitrogen atmosphere, 3.00 g of 2,7-dibromo-9,9'-spirobi[fluorene], 0.18 g of PdCl$_2$(PPh$_3$)$_2$, 0.024 g of copper iodide, 0.13 g of triphenyl phosphine, 30 ml of diisopropylamine and 1.44 g of ethynyltrimethylsilane were charged in a reaction apparatus, and the mixture was stirred under reflux conditions by heating for 6 hours. After adding methanol to the reaction mixture, the filtrate obtained by filtration thereof was dried to obtain 2.69 g (Yield: 84%) of the objective M-4 TMS.

(2) Synthesis of M-4

Under nitrogen atmosphere, 2.69 g of M-4 TMS and 30 ml of methylene chloride were charged in a reaction apparatus and after dissolution thereof, a solution prepared from 1.05 g of sodium hydroxide and 20 ml of methanol was added thereto dropwise and the mixture was stirred at room temperature for 30 minutes. To the reaction mixture was added deionized water, the liquids were separated, and the organic layer was washed with a saturated saline, concentrated and dried to obtain 1.85 g (Yield: 96%) of the objective M-4.

Example 1: Production of Sample 1

(1) Synthesis of BP-1

[Formula 32]

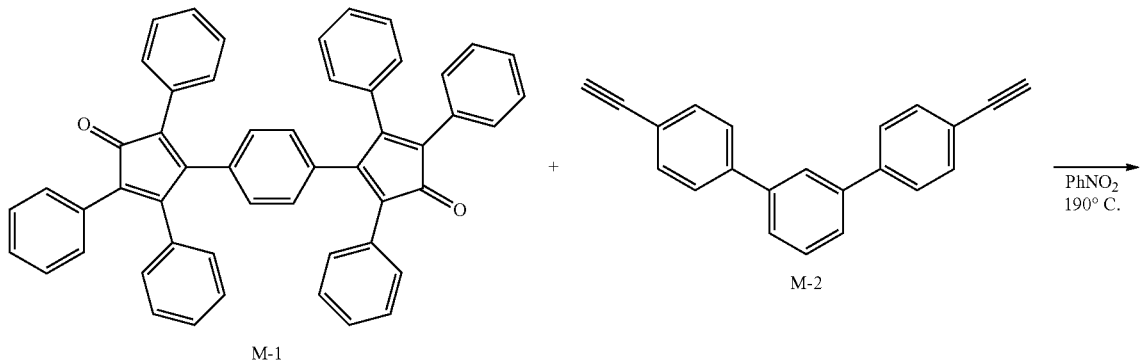

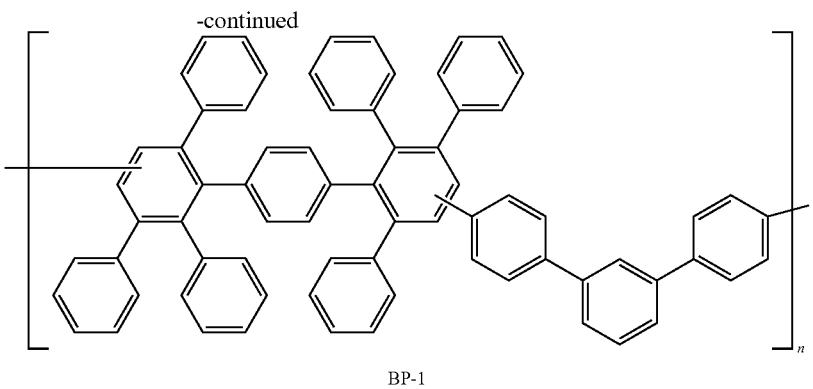

BP-1

Under nitrogen atmosphere, 2.48 g of M-1, 1.00 g of M-2 and 25 ml of nitrobenzene were charged in a reaction apparatus, and the mixture was stirred at 190° C. for 24 hours. The reaction mixture was added dropwise to 500 ml of ethyl acetate, and after subjecting to stirring, filtration was carried out and the filtrate was dried to obtain 3.13 g (Yield: 95%) of the objective BP-1. The obtained BP-1 had Mn of 33,000, Mw of 95,800, and PD (Mw/Mn) of 2.9.

(2) Synthesis of Sample 1

[Formula 33]

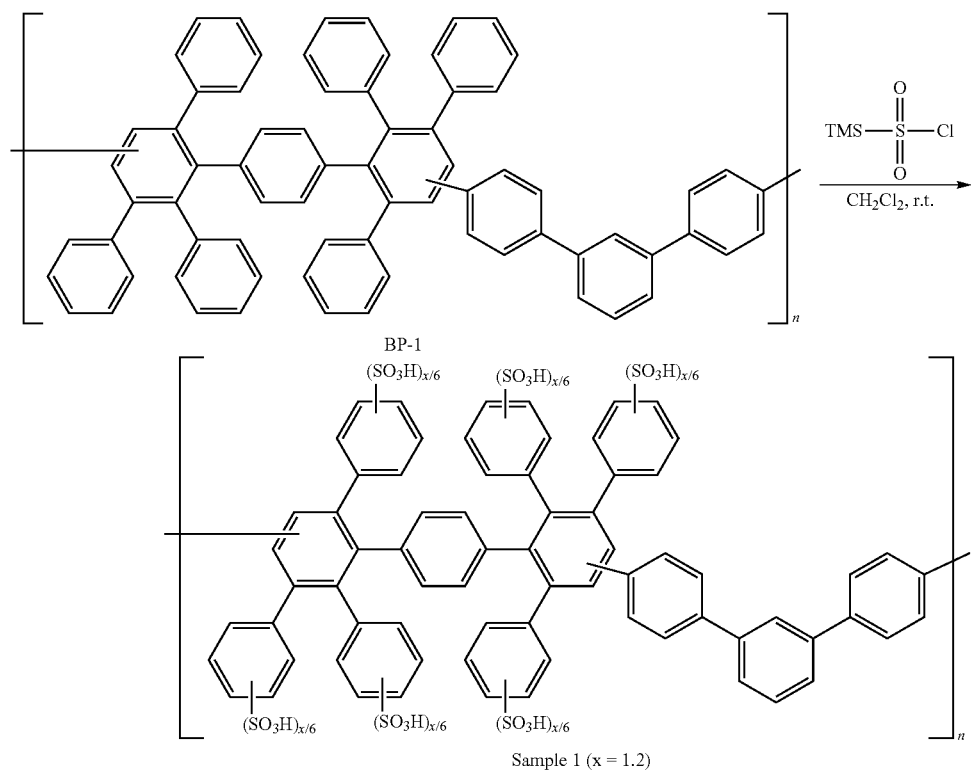

Sample 1 (x = 1.2)

Under nitrogen atmosphere, 0.20 g of BP-1 and 5 ml of methylene chloride were charged in a reaction apparatus, and the mixture was stirred at room temperature to dissolve the materials. After confirmation of dissolution, a solution prepared from 0.083 g of trimethylsilane sulfonyl chloride and 0.5 ml of methylene chloride was added dropwise to the mixture, and the resulting mixture was stirred at room temperature for 5 hours. To the reaction mixture was added ethanol to stop the reaction, and the reaction mixture was added dropwise to acetone and stirred at room temperature. After subjecting to filtration, the filtrate was dried to obtain 0.18 g of the objective Sample 1 (Sample 1 in the above-mentioned formulae, hereinafter the same).

Proton exchange capacity (IEC) 1.16 meq/g

Example 2: Production of Sample 2

(1) Synthesis of BP-2

[Formula 34]

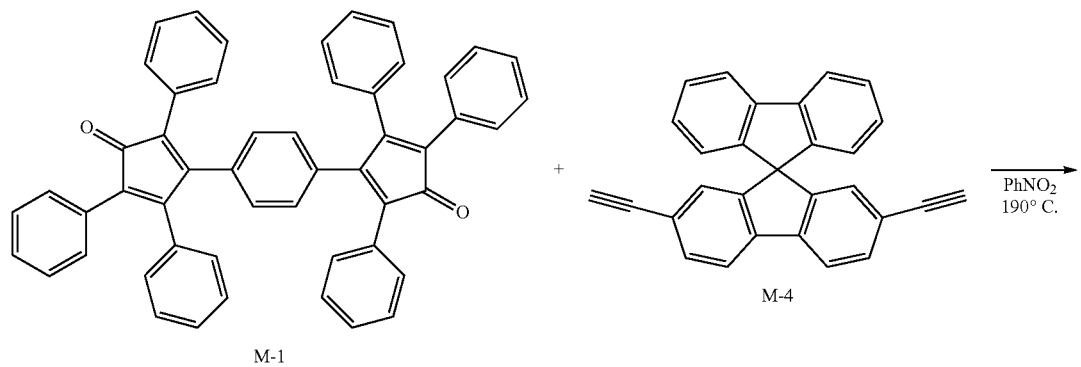

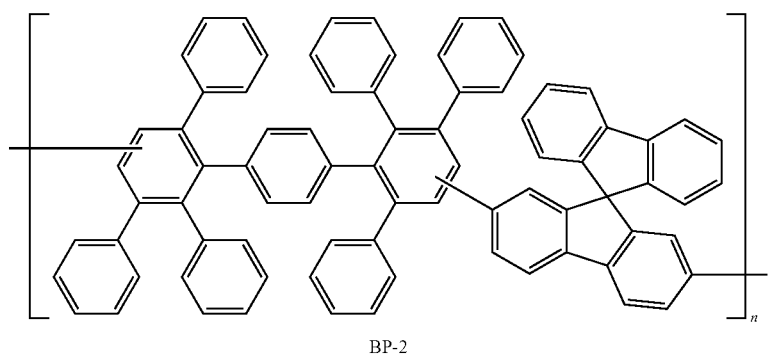

Under nitrogen atmosphere, 3.24 g of M-1, 1.71 g of M-4 and 35 ml of nitrobenzene were charged in a reaction apparatus, and the mixture was stirred at 190° C. for 15 hours. The reaction mixture was added dropwise to ethyl acetate, the resulting mixture was stirred at room temperature and filtration was carried out. The filtrate was dried to obtain 2.68 g (Yield: 57%) of the objective BP-2.

Mn 16,400, Mw 40,800, PD 2.5

(2) Synthesis of Sample 2

[Formula 35]

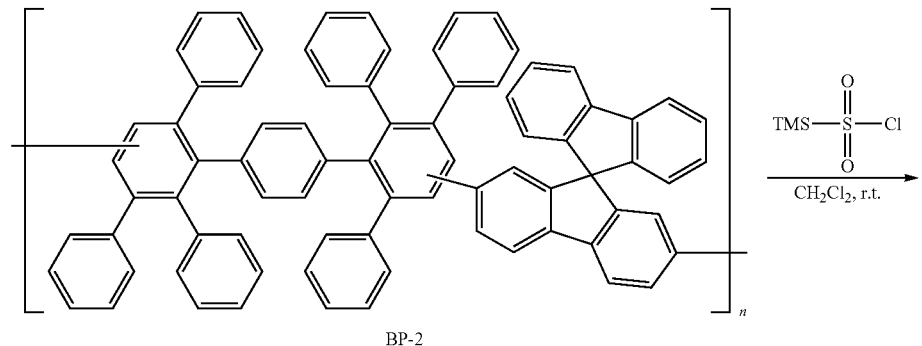

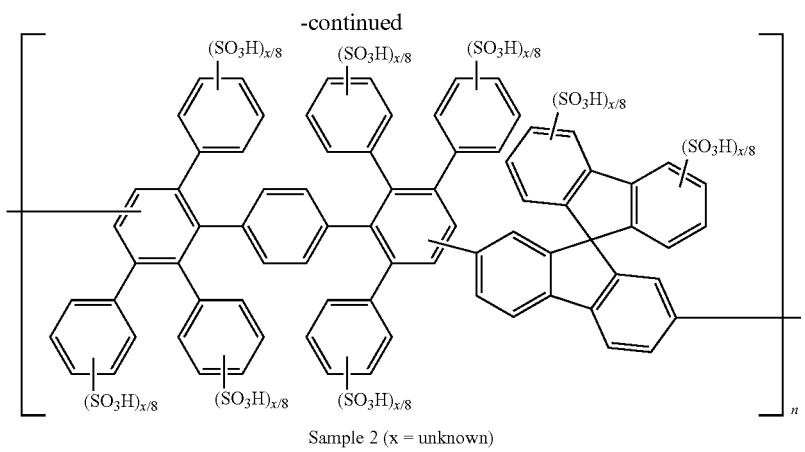

Sample 2 (x = unknown)

Under nitrogen atmosphere, 0.20 g of BP-2 and 5 ml of methylene chloride were charged in a reaction apparatus, and the mixture was stirred at room temperature to dissolve the materials. After confirmation of dissolution, a solution prepared by 0.076 g of trimethylsilane sulfonyl chloride and 0.5 ml of methylene chloride was added dropwise to the solution, and the resulting mixture was stirred at room temperature for 3 hours. After adding ethanol to the reaction mixture to stop the reaction, the reaction mixture was added dropwise to methanol, and the resulting mixture was stirred at room temperature. Filtration was carried out and the filtrate was dried to obtain 0.18 g of the objective Sample 2.

Example 3: Production of Sample 3

(1) Synthesis of BP-3

[Formula 36]

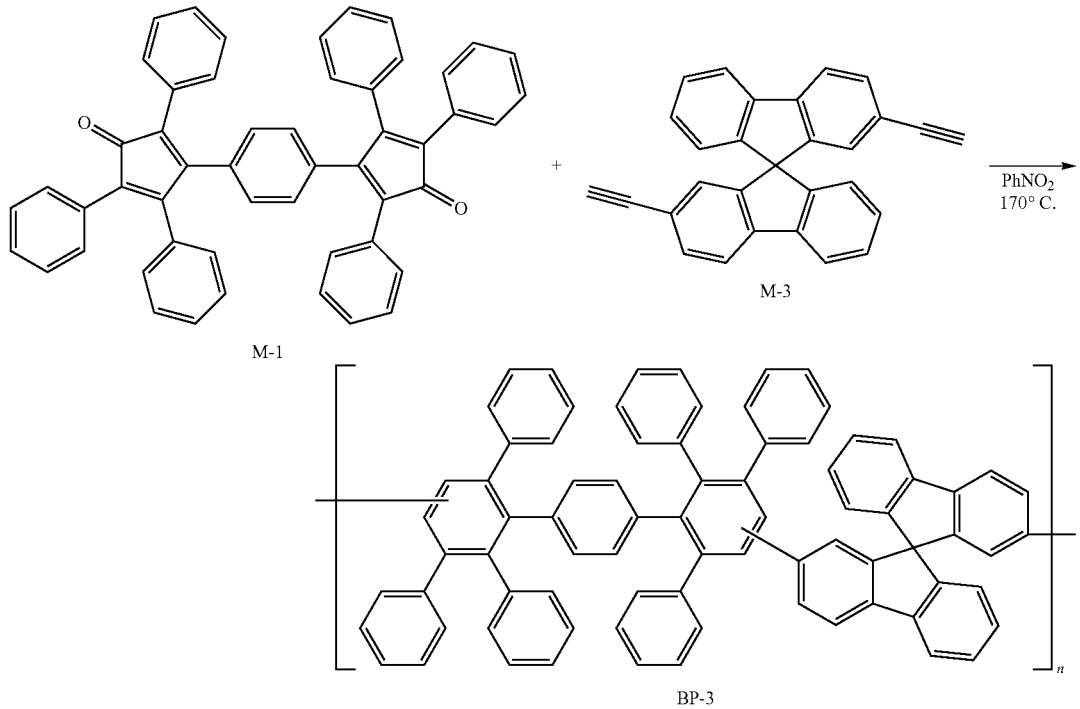

Under nitrogen atmosphere, 0.57 g of M-1, 0.30 g of M-3 and 3 ml of nitrobenzene were charged in a reaction apparatus, and the mixture was stirred at 170° C. for 20 hours. After adding nitrobenzene to the reaction mixture, the resulting mixture was added dropwise to methanol, and the resulting mixture was stirred at room temperature, and filtration was carried out. The filtrate was dried to obtain 0.77 g (Yield: 91%) of the objective BP-3.

Mn 20,200, Mw 64,700, PD 3.2

(2) Synthesis of Sample 3

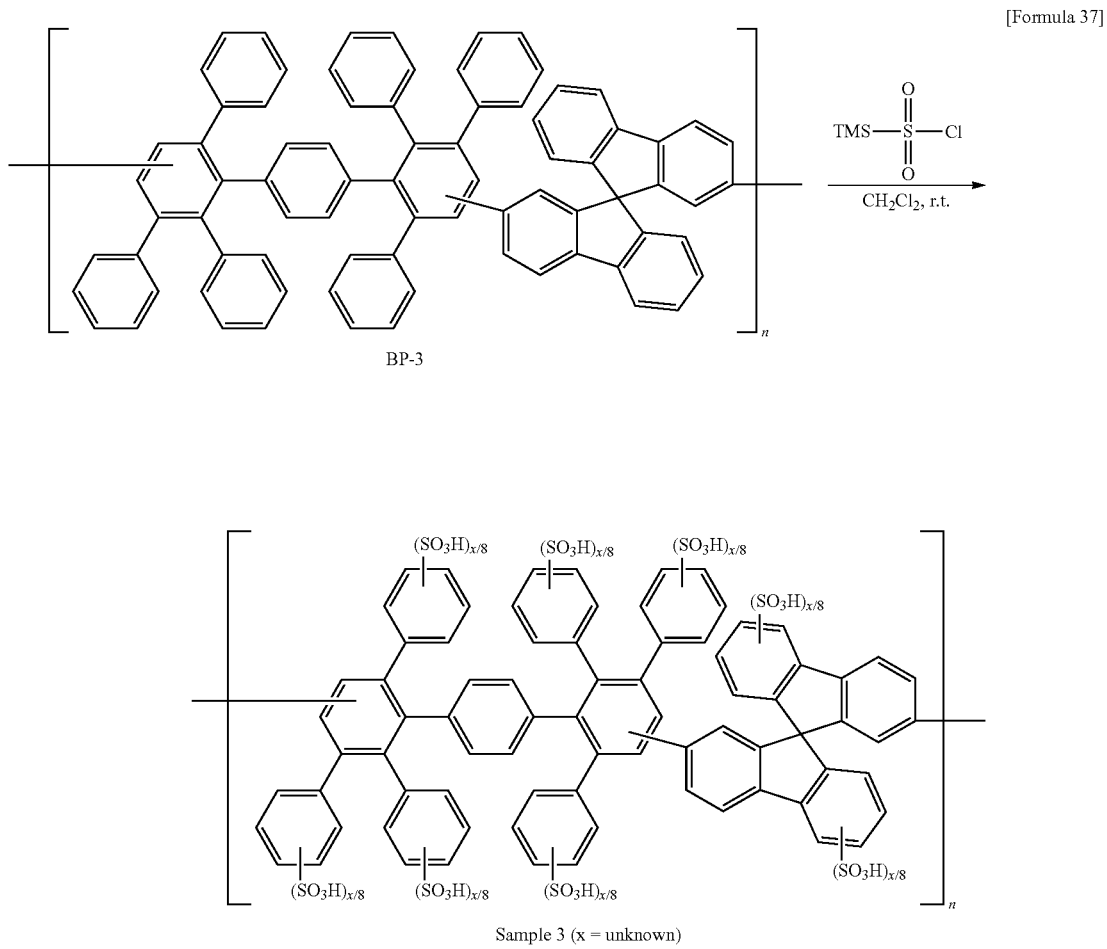

Under nitrogen atmosphere, 0.30 g of BP-3 and 5 ml of methylene chloride were charged in a reaction apparatus, and the mixture was stirred at room temperature to dissolve the materials. After confirmation of dissolution, a solution prepared by 0.11 g of trimethylsilane sulfonyl chloride and 0.5 ml of methylene chloride was added dropwise to the solution, and the resulting mixture was stirred at room temperature for 1 hour. After adding ethanol to the reaction mixture to stop the reaction, the reaction mixture was added dropwise to n-hexane, and the resulting mixture was stirred at room temperature. Filtration was carried out and the filtrate was dried to obtain 0.26 g of the objective Sample 3.

Example 4: Production of Sample 4

(1) Synthesis of BP-4

[Formula 38]

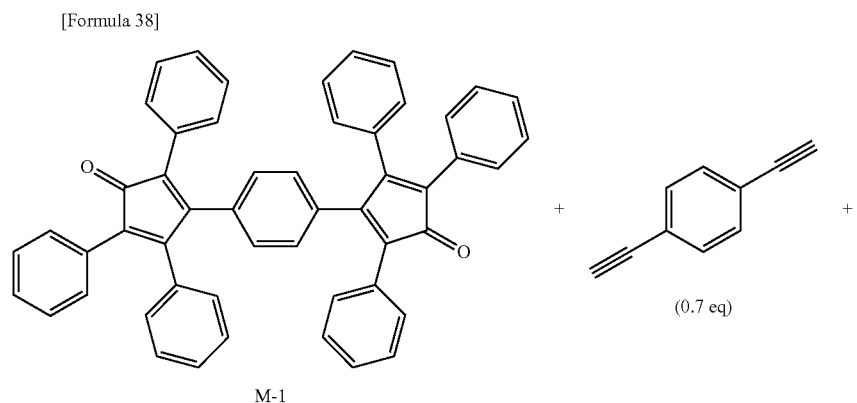

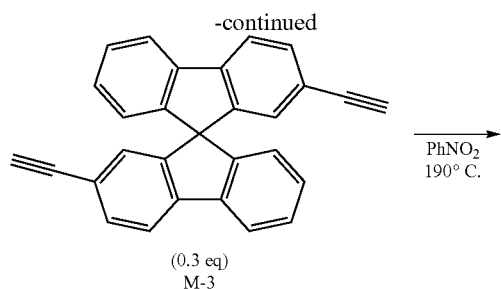

(0.3 eq)
M-3

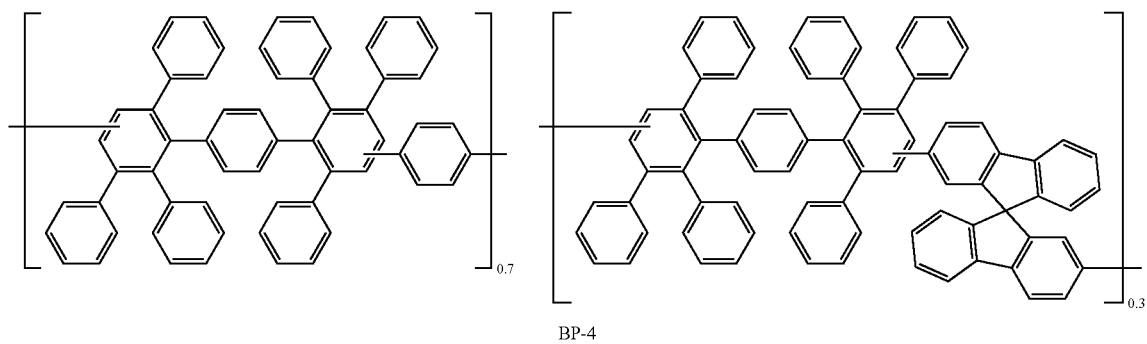

BP-4

Under nitrogen atmosphere, 0.60 g of M-1, 0.077 g of 1,4-diethynylbenzene, 0.095 g of M-3 and 3 ml of nitrobenzene were charged in a reaction apparatus, and the mixture was stirred at 190° C. for 8 hours. The reaction mixture was cooled to about 100° C., nitrobenzene was added and the mixture was stirred, and then, the solution was added dropwise to methanol and the resulting mixture was stirred at room temperature. Filtration was carried out and the obtained filtrate was dried to obtain 0.69 g (Yield: 92%) of the objective BP-4.

Mn 26,000, Mw 77,000, PD 3.0

(2) Synthesis of Sample 4

[Formula 39]

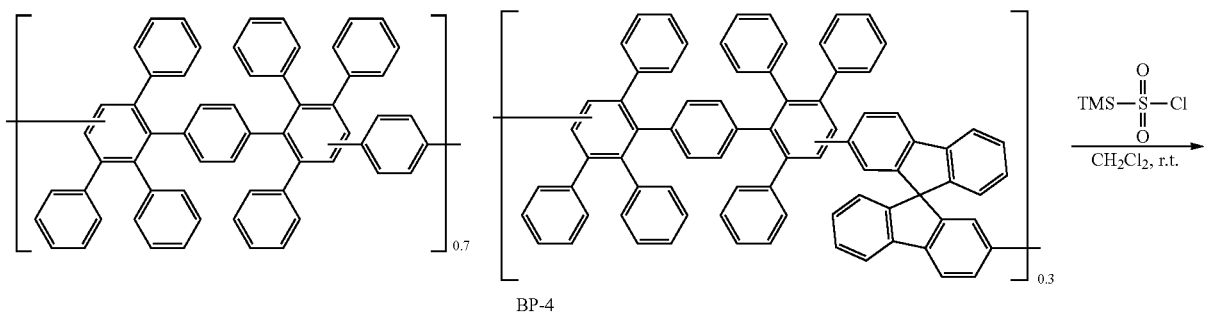

BP-4

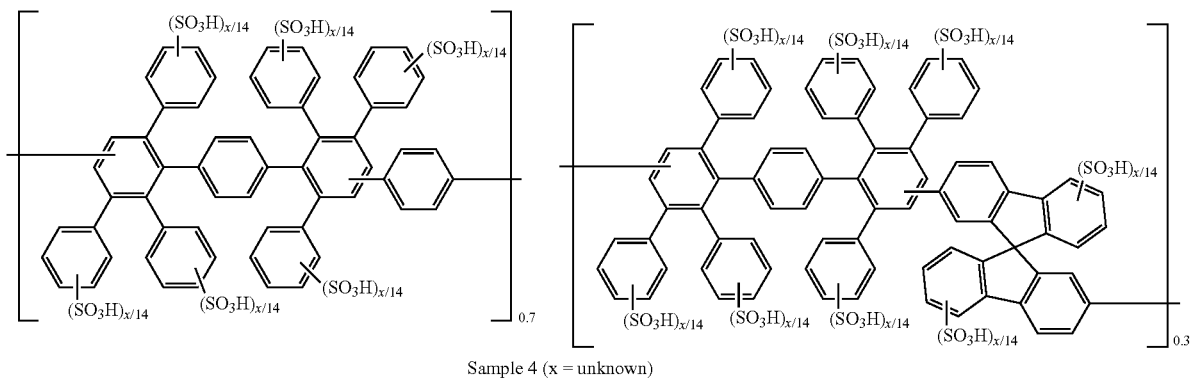

Sample 4 (x = unknown)

Under nitrogen atmosphere, 0.30 g of BP-4 and 5 ml of methylene chloride were charged in a reaction apparatus, and the mixture was stirred at room temperature to dissolve the material. After confirmation of dissolution, a solution prepared by 0.14 g of trimethylsilane sulfonyl chloride and 0.5 ml of methylene chloride was added dropwise to the solution, and the resulting mixture was stirred at room temperature for 1.5 hours. After adding ethanol to the reaction mixture to stop the reaction, the reaction mixture was added dropwise to acetone and the resulting mixture was stirred at room temperature. Filtration was carried out and the filtrate was dried to obtain 0.26 g of the objective Sample 4.

Example 5: Production of Sample 5

(1) Synthesis of BP-5

[Formula 40]

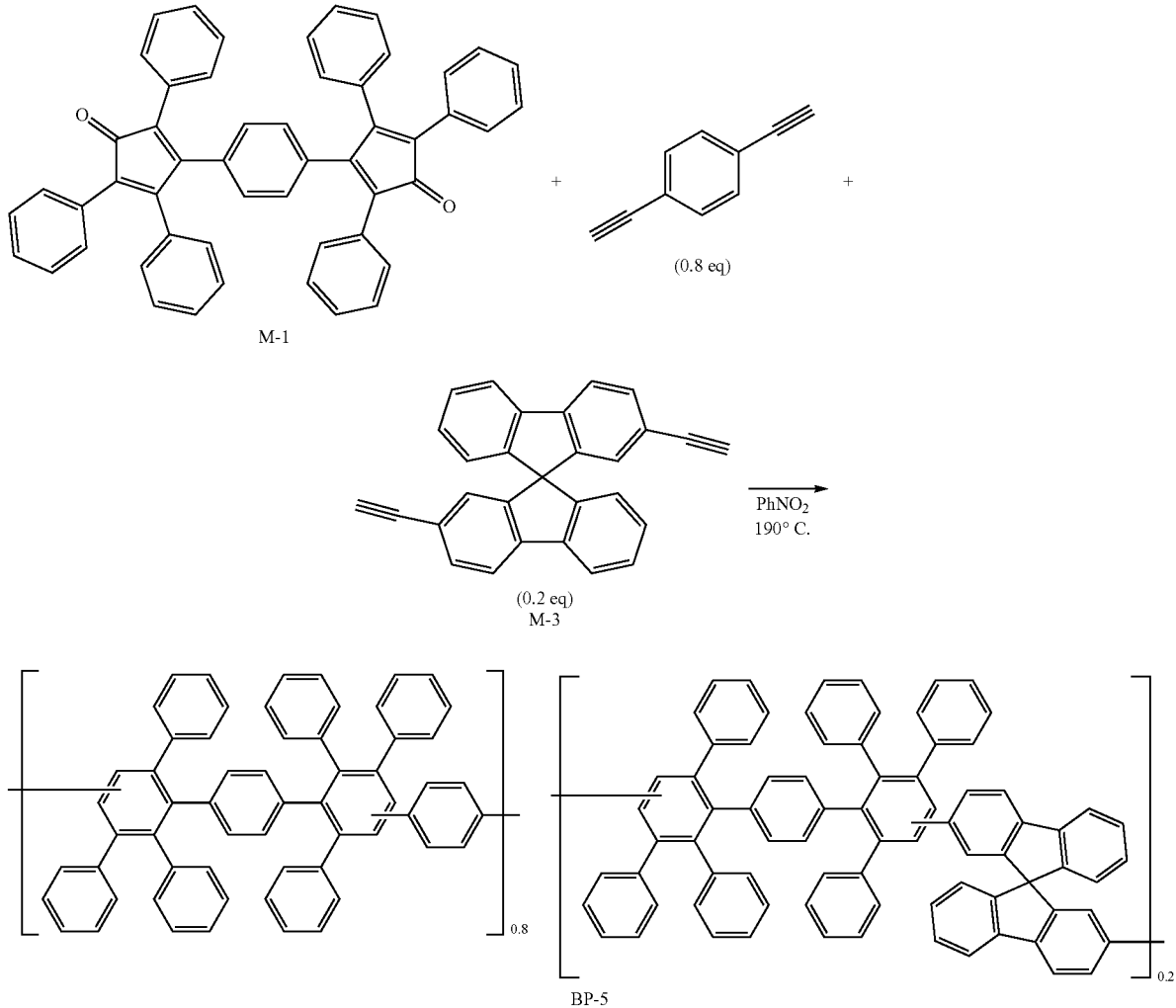

Under nitrogen atmosphere, 0.60 g of M-1, 0.088 g of 1,4-diethynylbenzene, 0.064 g of M-3 and 3 ml of nitrobenzene were charged in a reaction apparatus, and the mixture was stirred at 190° C. for 24 hours. The reaction mixture was cooled to about 100° C., and after adding toluene to the mixture and stirring the same, the solution was added dropwise to methanol and the resulting mixture was stirred at room temperature. Filtration was carried out and toluene was added to the obtained filtrate to make it a solution, and the solution was again added dropwise to methanol and the resulting mixture was stirred at room temperature. Filtration was carried out and the resulting filtrate was dried to obtain 0.67 g (Yield: 95%) of the objective BP-5.

Mn 44,100, Mw 146,000, PD 3.3

(2) Synthesis of Sample 5

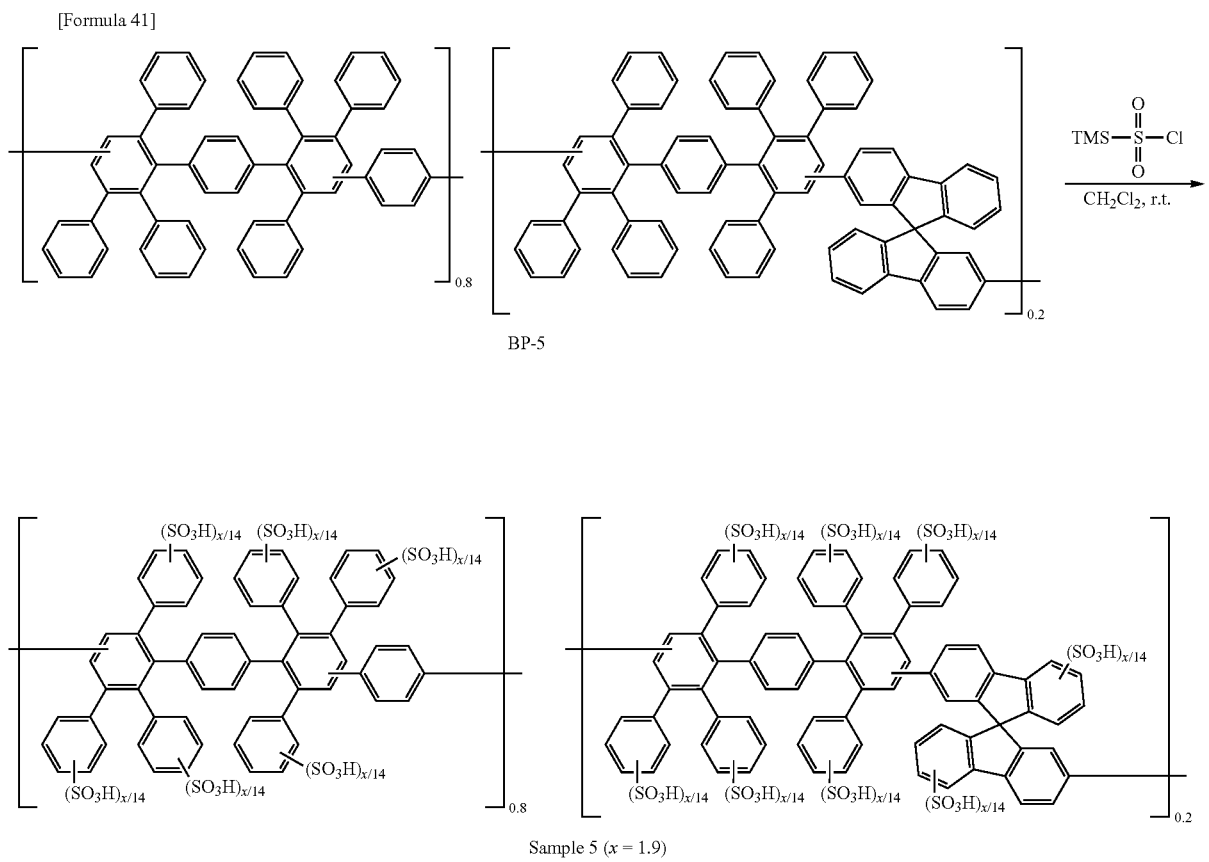

Sample 5 (x = 1.9)

Under nitrogen atmosphere, 0.30 g of BP-5 and 7 ml of methylene chloride were charged in a reaction apparatus, and the mixture was stirred at room temperature to dissolve the material. After confirmation of dissolution, a solution prepared by 0.14 g of trimethylsilane sulfonyl chloride and 0.5 ml of methylene chloride was added dropwise to the solution, and the resulting mixture was stirred at room temperature for 30 minutes. After adding ethanol to the reaction mixture to stop the reaction, the reaction mixture was added dropwise to acetone and the resulting mixture was stirred at room temperature. Filtration was carried out and the filtrate was dried to obtain 0.28 g of the objective Sample 5.

Proton exchange capacity (IEC) 0.93 meq/g

Example 6: Production of Sample 6

(1) Synthesis of BP-5

BP-5 was synthesized in the same manner as in (1) of Example 5.

(2) Synthesis of Sample 6

[Formula 42]

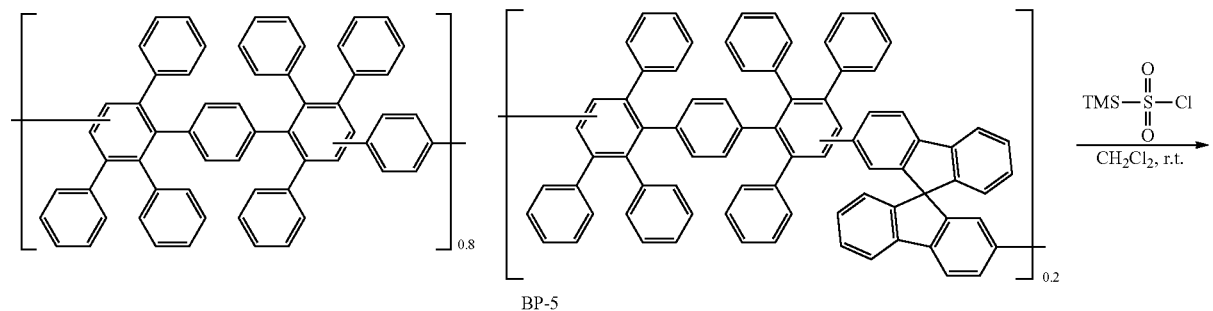

BP-5

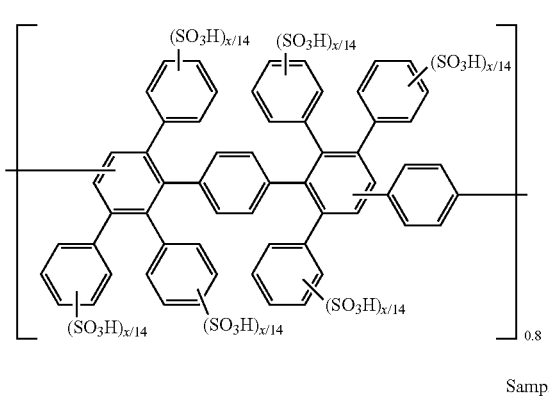
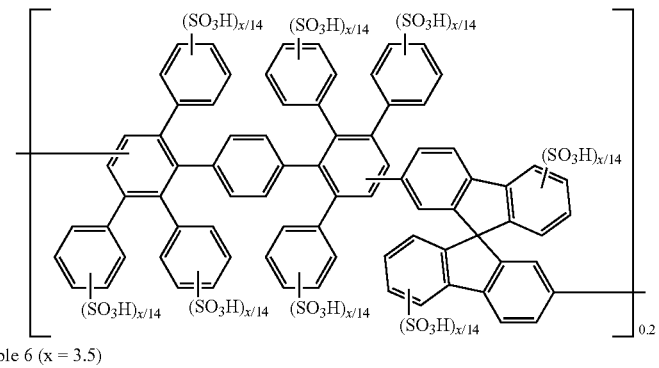

Sample 6 (x = 3.5)

Under nitrogen atmosphere, 0.15 g of BP-5 and 3.5 ml of methylene chloride were charged in a reaction apparatus, and the mixture was stirred at room temperature to dissolve the material. After confirmation of dissolution, a solution prepared by 0.14 g of trimethylsilane sulfonyl chloride and 0.5 ml of methylene chloride was added dropwise to the solution, and the resulting mixture was stirred at room temperature for 2.5 hours. After adding ethanol to the reaction mixture to stop the reaction, the reaction mixture was added dropwise to n-hexane and the resulting mixture was stirred at room temperature. Filtration was carried out and the filtrate was dried to obtain 0.13 g of the objective Sample 6.

Proton exchange capacity (IEC) 1.59 meq/g

Example 7: Production of Sample 7

(1) Synthesis of M-5

[Formula 43]

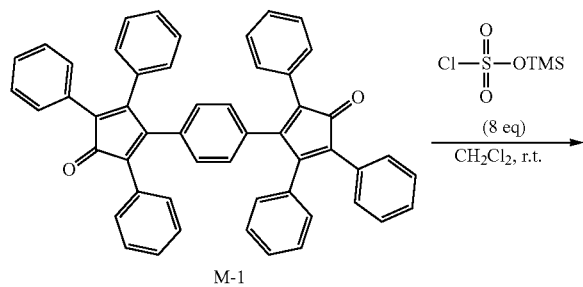

Under nitrogen atmosphere, after 4.00 g of M-1 and 300 mL of dichloromethane were charged in a reaction apparatus, 8.76 g of trimethylsilyl chlorosulfonate was added dropwise to the mixture, and the resulting mixture was stirred at room temperature for 18 hours. After adding 5 mL of ethanol to the reaction mixture to stop the reaction, the reaction mixture was added dropwise to diethyl ether and the resulting mixture was stirred at room temperature. Filtration was carried out and the filtrate was dried to obtain 4.27 g (Yield: 73%) of the objective M-5.

$^1$H NMR (500 MHz, DMSO-d6) δ (ppm): 6.86 (s, 4H), 6.92 (d, J=7.5 Hz, 4H), 7.07 (d, J=8.5 Hz, 4H), 7.13 (d, J=8.5 Hz, 4H), 7.25 (t, J=7.5 Hz, 4H), 7.33 (t, J=7.5 Hz, 2H), 7.47 (d, J=8.0 Hz, 4H), 7.51 (d, J=8.0 Hz, 4H).

(2) Synthesis of M-6

[Formula 44]

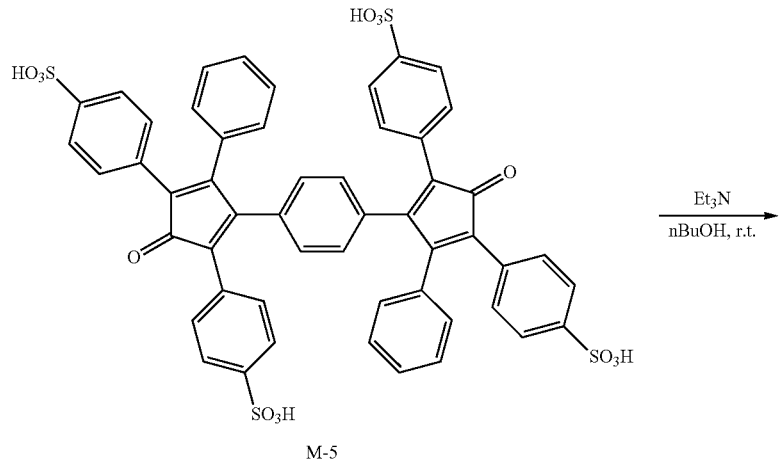

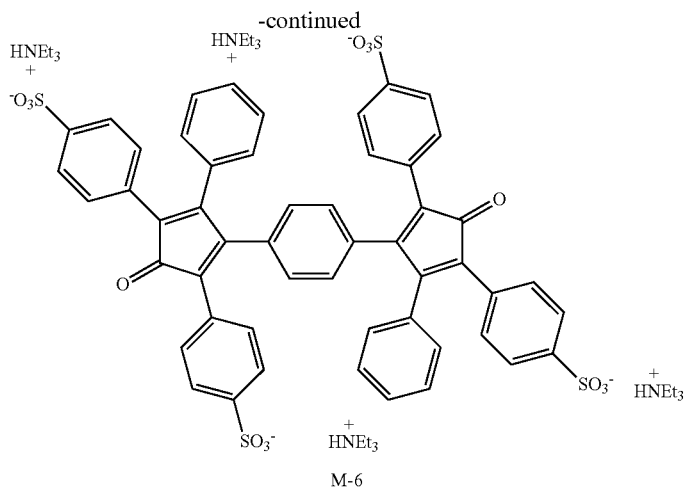
M-6
In a reaction apparatus were charged 4.00 g of M-5, 185 mL of n-butanol and 91 mL of triethylamine, and the mixture was stirred at room temperature for 20 minutes. After filtering the reaction mixture, the filtrate was dried to obtain 5.2 g (Yield: 93%) of the objective M-6.
$^1$H NMR (500 MHz, DMSO-d6) δ (ppm): 1.17 (t, J=7.5 Hz, 36H), 3.09 (q, J=7.5 Hz, 24H), 6.87 (s, 4H), 6.92 (d, J=7.0 Hz, 4H), 7.08 (d, J=8.5 Hz, 4H), 7.14 (d, J=8.5 Hz, 4H), 7.26 (t, J=7.0 Hz, 4H), 7.34 (m, 2H), 7.48 (m, 4H), 7.51 (d, J=8.0 Hz, 4H).
(3) Synthesis of Sample 7
[Formula 45]
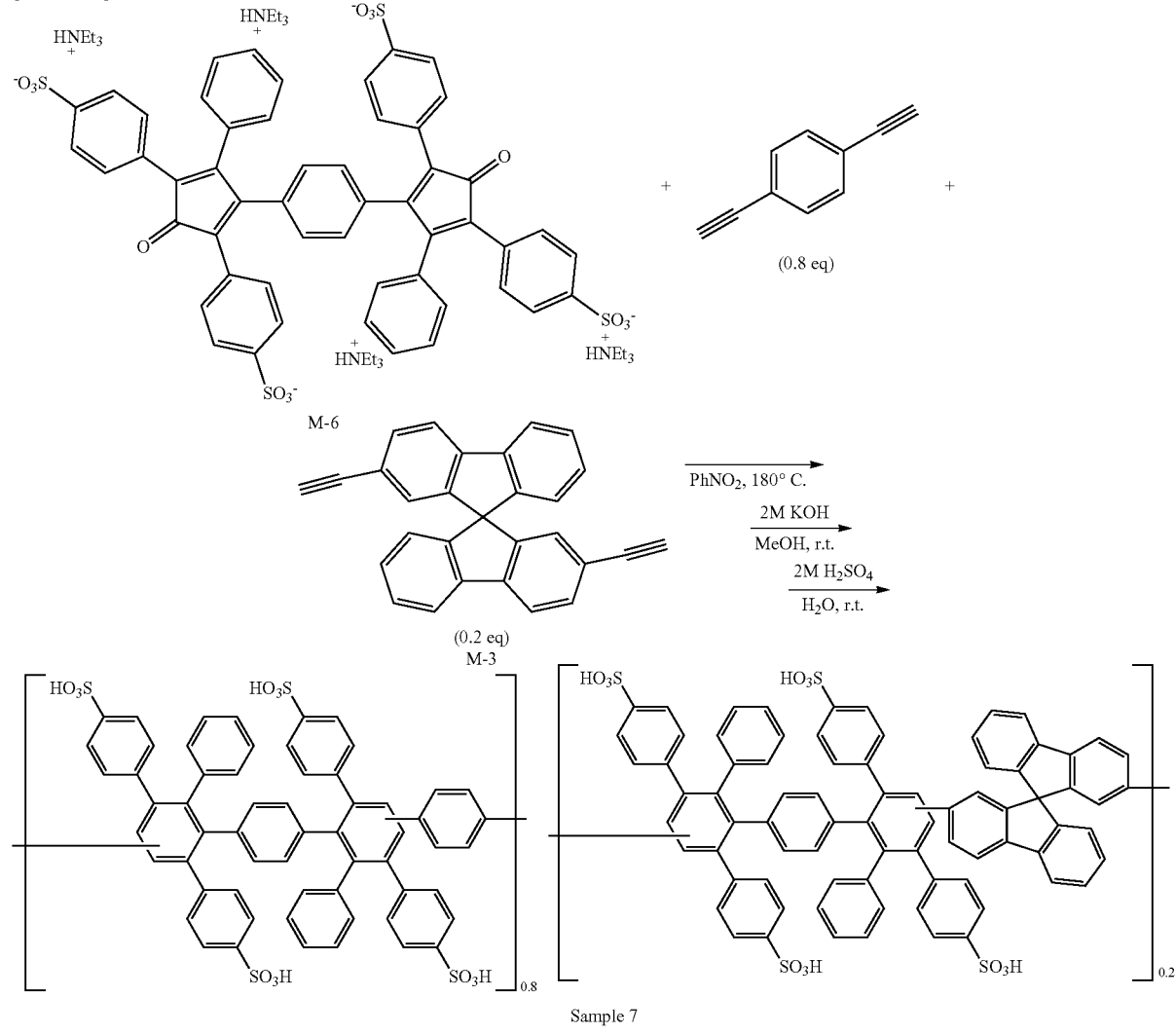
Sample 7

Under nitrogen atmosphere, 0.997 g of M-6, 0.0706 g of 1,4-diethynylbenzene, 0.0513 g of M-3 and 9 ml of nitrobenzene were charged in a reaction apparatus, and the mixture was stirred under heating at 180° C. for 16 hours. Insoluble materials in the reaction apparatus were taken out, and after dissolving in DMF, the solution was added dropwise in ethyl acetate to reprecipitate the material. Filtration was carried out and the resulting filtrate was dried to obtain 0.956 g of the objective polymer. To a suspension in which methanol had been added to the polymer was added dropwise 75 mL of 2M KOH methanol solution, and the resulting mixture was stirred at room temperature for 2 hours. Thereafter, filtration and drying were carried out to obtain 0.859 g of a potassium salt of the polymer, and deionized water was added thereto to prepare a suspension. To the suspension was added 2M aqueous $H_2SO_4$ solution, and the resulting mixture was stirred at room temperature for 2 hours. Filtration was carried out and the obtained filtrate was dried to obtain 0.293 g (Yield: 59%) of the objective Sample 7 as a sulfonic acid polymer.

Mn 38,400, Mw 48,400, PD 1.3

Comparative Example 1

According to the description of U.S. Pat. No. 7,301,002, the compound having the following formula was produced to make it Sample 7.

[Formula 46]

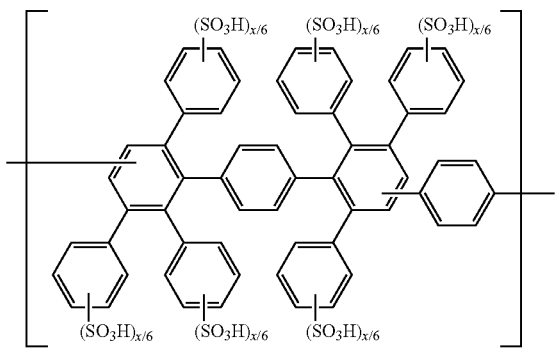

<Film Forming Method>

With regard to the obtained Samples 1, 6 and 7, film formation was carried out by the following method.

To 50 mg of the sample was added 450 mg of N,N-dimethylacetamide to dissolve the sample therein, then, filtration was carried out through a 0.2 μm filter made of PTFE, and the filtrate was coated on a glass substrate. The solvent was evaporated on a hot plate at 60° C. for 2 hours, at 80° C. for 6 hours and at 100° C. for 2 hours, and further drying was carried out at 80° C. in a vacuum dryer for 6 hours to obtain self-supporting membranes of Samples 1, 6 and 7.

With regard to the self-supporting membranes obtained from Samples 1, 6, and 7, proton exchange capacity, proton conductivity and oxygen permeability were measured and the results are shown in Table 2.

TABLE 1

| Polymer | Proton exchange capacity (meq/g) | Proton conductivity (mS/cm) |
|---|---|---|
| Example 1 | 1.16 | 1.9 |
| Example 6 | 1.59 | 20 |

TABLE 1-continued

| Polymer | Proton exchange capacity (meq/g) | Proton conductivity (mS/cm) |
|---|---|---|
| Example 7 | 2.62 | 105 |
| Comparative Example 1 | 2.01 | 1.2 |

TABLE 2

| Polymer | Oxygen permeability coefficient ($cm^3 \cdot cm/cm^2 \cdot sec \cdot cmHg$) |
|---|---|
| Example 1 | $9.9 \times 10^{-10}$ |
| Example 6 | $1.4 \times 10^{-9}$ |
| Comparative Example 1 | $1.5 \times 10^{-9}$ |

From the above-mentioned results, when Comparative Example 1 and Examples 1 and 6 are compared to each other, it can be understood that Examples 1 and 6 show high proton conductivity whereas they have low ion exchange capacity than that of Comparative Example 1. In addition, in Example 7 into which a specific number of the sulfo groups is introduced, it can be understood that it shows extremely high proton conductivity.

EXPLANATION OF REFERENCE NUMERALS

100 Fuel cell
101 Gas diffusion layer
103 Anode catalyst layer
105 Cathode catalyst layer
107 Solid electrolyte membrane
109 Separator

The invention claimed is:

1. A compound having a structure represented by the following general formula (I):

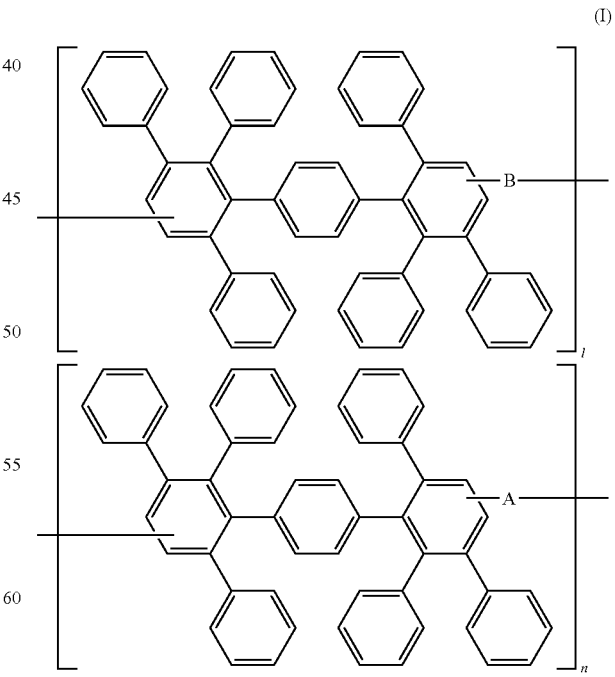

in the above-mentioned general formula (I), "1" and "n" are molar fractions when l+n=1.0, and 0≤l<1.0 and 0<n≤1.0, A represents a structure represented by the following general formula (II) or (III),
B represents a structure represented by the following general formula (VII),
the respective structural units are random copolymerized, and
at least one benzene ring in the formula (I) has at least one sulfo group,

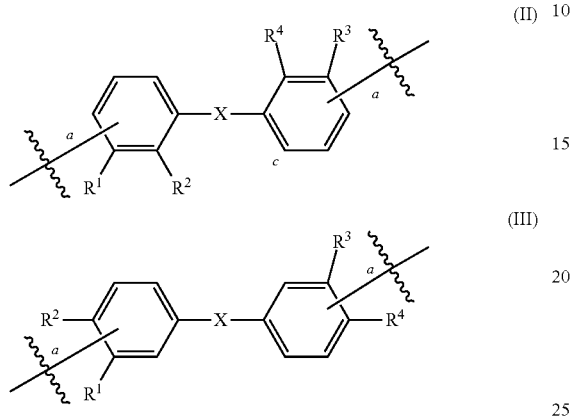

in the above-mentioned general formula (II) or (III), 1e to R⁴ are each independently selected from hydrogen and an alkyl group having 1 to 3 carbon atoms, R¹ and R² form together with the carbon atom, they are attached to, an aromatic ring or a fused aromatic ring and R³ and R⁴ form together with the carbon atom, they are attached to, an aromatic ring or a fused aromatic ring, or R¹, R³ and R⁴ are hydrogens and R² is a single bond and bonded to the carbon of "c",
X is a single bond, or a structure represented by the following formula (IV), the following formula (V) or the following formula (VI),
when X is a single bond, bonds "a"s are both bonded at ortho positions or both bonded at meta positions relative to the carbons bonded to X, when X is a structure represented by the following formula (IV), the bonds "a"s are both bonded at para positions relative to the carbons bonded to X, and when it is a structure represented by the following formula (V), the bonds "a"s are both bonded at para positions or both bonded at meta positions relative to the carbons bonded to X, when X is a structure represented by the following formula (VI), the bonds "a"s in the above-mentioned general formula (II) or (III) exist only one of these, and A binds to other structure or a structural unit by one of the bonds "a"s and the bond "b".

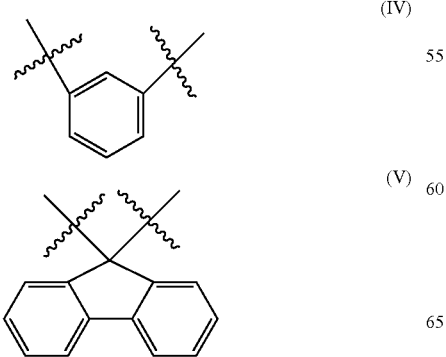

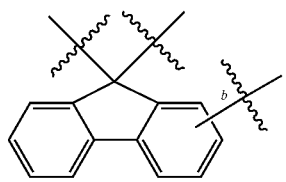

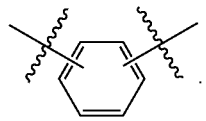

2. The compound according to claim 1, wherein, in the above-mentioned general formula (I), the structure represented by A is at least one kind selected from the group consisting of:

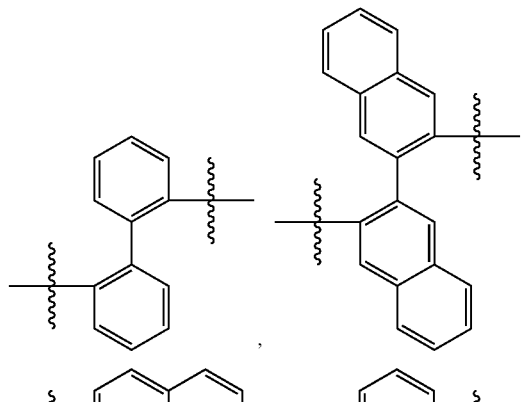

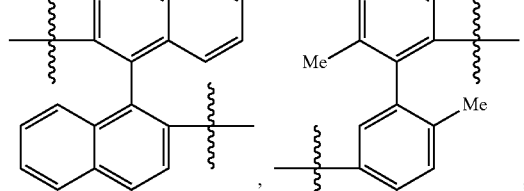

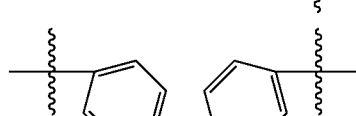

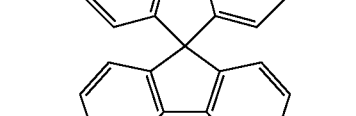

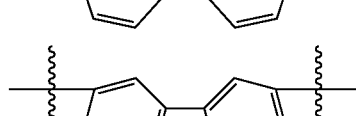

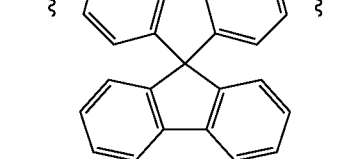

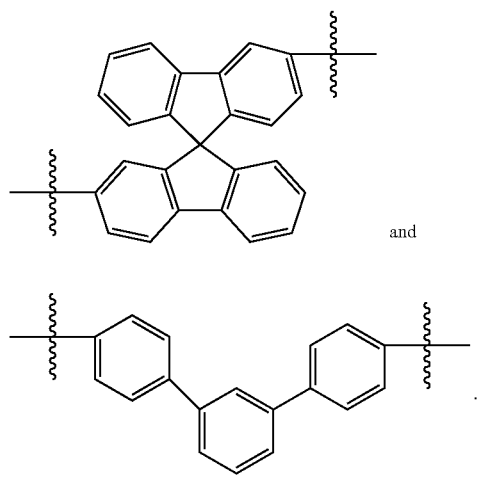

and

3. The compound according to claim 1, which is for a fuel cell.

4. The compound according to claim 3, which is used for an electrolyte of an anode catalyst layer and/or a cathode catalyst layer of a fuel cell.

5. A catalyst layer of a fuel cell which contains the compound according to claim 1.

6. A method for producing the compound according to claim 1, which comprises Step 1 of reacting a compound represented by the following formula (VIII), a compound represented by the following formula (IX) and optionally a compound represented by the following formula (X) to obtain a compound represented by the following formula (XI),

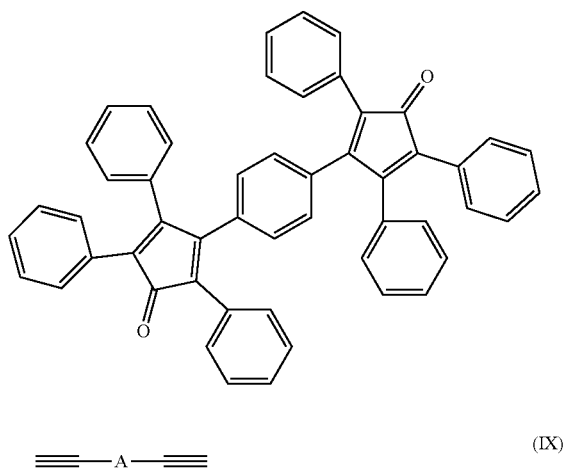

(VIII)

(IX)

(X)

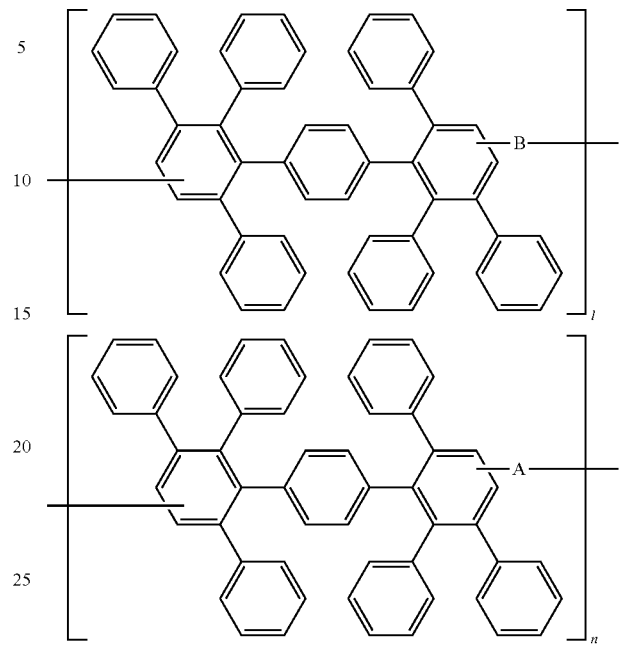

(XI)

in the above-mentioned general formula (IX) and (XI), "1", "n", A and B have the same meanings as defined in the formula (I), provided that each benzene ring does not have a sulfo group, and Step 2 of sulfonating the compound represented by the above-mentioned formula (XI) to obtain the compound represented by the above-mentioned formula (I).

7. A method for producing the compound according to claim 1, which comprises a step of reacting: an amine salt of a compound of formula (VIII) having at least one sulfo group which became an amine salt in a compound of the following formula (VIII), a compound represented by the following formula (IX) and optionally a compound represented by the following formula (X) to obtain the compound represented by the above-mentioned formula (I):

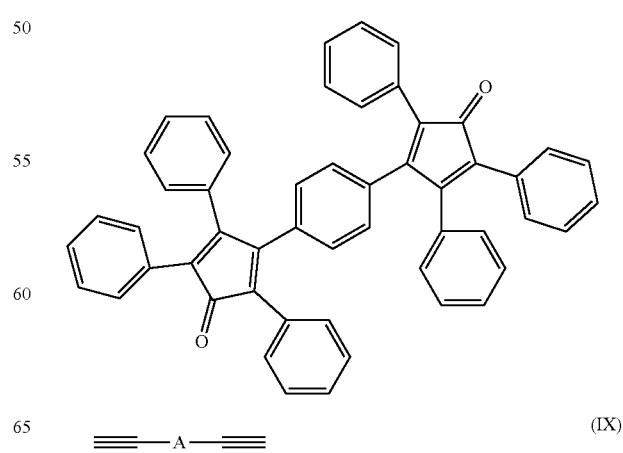

(VIII)

(IX)

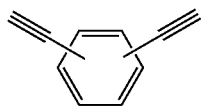 (X)
in the above-mentioned general formula (IX), A has the same meaning as defined in the formula (I), and wherein the compound of formula (VIII) is substituted with at least one sulfo group, which formulates the amine salt.
* * * * *